US007155035B2

(12) United States Patent
Kondo et al.

(10) Patent No.: US 7,155,035 B2
(45) Date of Patent: Dec. 26, 2006

(54) PERSONAL AUTHENTICATION METHOD, PERSONAL AUTHENTICATION APPARATUS AND IMAGE CAPTURING DEVICE

(75) Inventors: Kenji Kondo, Kyoto (JP); Takeo Azuma, Nara (JP); Kenya Uomori, Osaka (JP); Yoshito Aoki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 855 days.

(21) Appl. No.: 10/358,967

(22) Filed: Feb. 5, 2003

(65) Prior Publication Data
US 2003/0152252 A1 Aug. 14, 2003

(30) Foreign Application Priority Data
May 2, 2002 (JP) .............................. 2002-028446

(51) Int. Cl.
*G06K 9/00* (2006.01)
*H04K 1/00* (2006.01)
*G05B 19/00* (2006.01)

(52) U.S. Cl. ..................... 382/117; 713/186; 902/3; 340/5.52; 340/5.53

(58) Field of Classification Search ........ 382/115–127; 713/186; 902/3; 340/5.52, 5.53
See application file for complete search history.

(56) References Cited

U.S. PATENT DOCUMENTS

| 4,641,349 | A |   | 2/1987  | Flom et al. |         |
|-----------|---|---|---------|-------------|---------|
| 5,231,674 | A | * | 7/1993  | Cleveland et al. | 382/117 |
| 5,291,560 | A | * | 3/1994  | Daugman     | 382/117 |
| 5,901,238 | A |   | 5/1999  | Matsushita  |         |
| 6,021,210 | A | * | 2/2000  | Camus et al. | 382/117 |
| 6,064,752 | A | * | 5/2000  | Rozmus et al. | 382/117 |
| 6,069,967 | A | * | 5/2000  | Rozmus et al. | 382/117 |
| 6,088,470 | A |   | 7/2000  | Camus et al. |         |
| 6,134,339 | A | * | 10/2000 | Luo         | 382/115 |
| 6,215,891 | B1 |  | 4/2001  | Suzaki et al. |       |
| 6,247,813 | B1 |  | 6/2001  | Kim et al.  |         |
| 6,309,069 | B1 |  | 10/2001 | Seal et al. |         |
| 6,477,275 | B1 | * | 11/2002 | Melikian et al. | 382/217 |
| 6,714,665 | B1 | * | 3/2004  | Hanna et al. | 382/117 |
| 6,850,631 | B1 | * | 2/2005  | Oda et al.  | 382/117 |
| 2001/0026632 | A1 | * | 10/2001 | Tamai    | 382/116 |
| 2002/0039433 | A1 | * | 4/2002  | Shin     | 382/117 |
| 2003/0206645 | A1 | * | 11/2003 | Okazaki  | 382/117 |

(Continued)

FOREIGN PATENT DOCUMENTS

EP          1 041 522 A2      10/2000

(Continued)

OTHER PUBLICATIONS

Partial European Search Report for Application No. EP 03 00 2534; The Hague; Mailed Jun. 11, 2004.

(Continued)

*Primary Examiner*—Jingge Wu
*Assistant Examiner*—Aaron Carter
(74) *Attorney, Agent, or Firm*—Harness, Dickey & Pierce, P.L.C.

(57) ABSTRACT

A plurality of iris images of a person to be authenticated in which the positions of extraneous light reflection are respectively different are captured by using an image capturing device. Iris codes, that is, features for authentication, are respectively extracted from the plural iris images, and the plural iris codes thus extracted are respectively compared with a registered iris code, so as to generate a plurality of comparison results. The plural comparison results are integrated to obtain an ultimate comparison score, which is used for the authentication.

24 Claims, 21 Drawing Sheets

U.S. PATENT DOCUMENTS

2004/0047491 A1* 3/2004 Rydbeck .................... 382/103

FOREIGN PATENT DOCUMENTS

| EP | 1 139 301 A2 | 10/2001 |
|---|---|---|
| JP | 09-161135 | 6/1997 |
| JP | 09-212644 | 8/1997 |
| JP | 10-005195 | 1/1998 |
| JP | 10-021392 | 1/1998 |
| JP | 10-162146 | 6/1998 |
| JP | 10-162416 | 6/1998 |
| JP | 11-203478 | 7/1999 |
| JP | 2000-060825 | 2/2000 |
| JP | 2000-132686 A | 5/2000 |
| JP | 2000-185032 | 7/2000 |
| JP | 2001-167252 | 6/2001 |
| WO | WO94/09446 | 4/1994 |
| WO | WO-97/21188 | 6/1997 |
| WO | WO 98/08439 | 3/1998 |
| WO | WO 02/31750 A1 | 4/2002 |

OTHER PUBLICATIONS

Notice of Reasons of Rejection for Japanese Patent Application No. 2003-020892; Mailed Apr. 27, 2004; and English translation thereof.

Williams, Gerald O.; "Iris Recognition Technology"; IEEE Arospace and Electronic Systems Magazine; IEEE Inc.; New York, U.S.; vol. 12, No. 4; Apr. 1, 1997; pp. 23-29; XP000677464.

European Search Report for Application No. EP 03 00 2534; Mailed Aug. 10, 2004.

* cited by examiner

FIG. 5
Direction of sight line
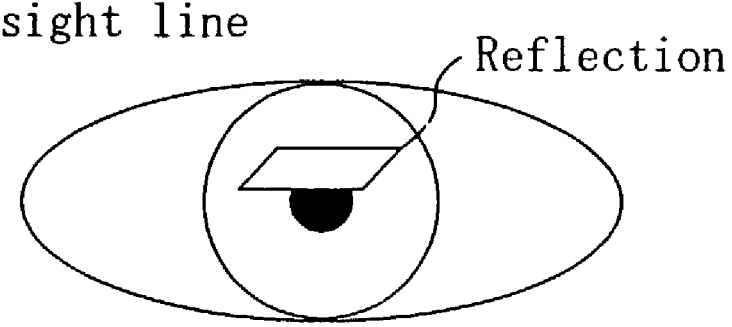
Front
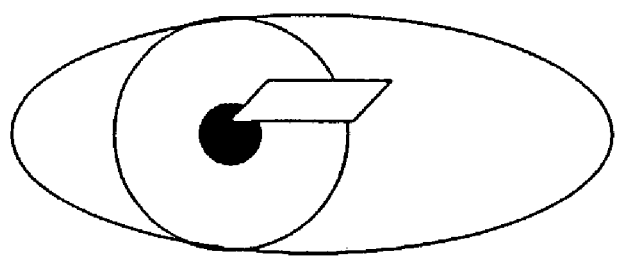
Left
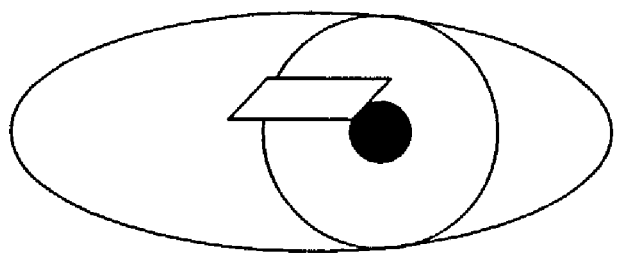
Right
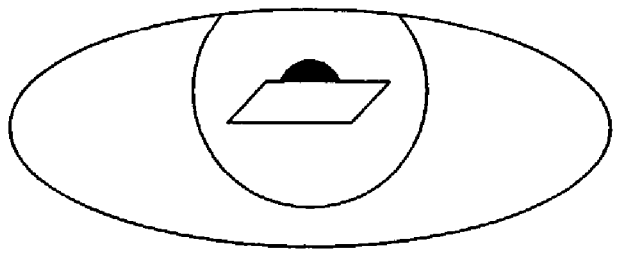
Above

FIG. 6
Direction of facing
East 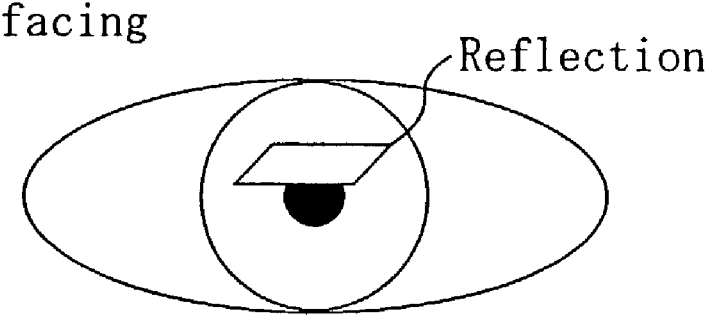
West 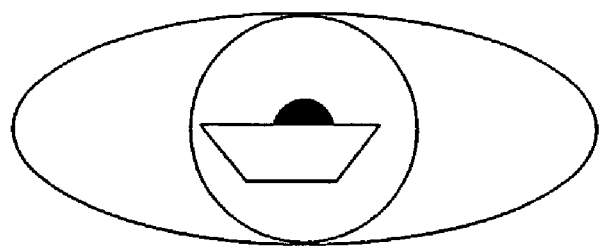
South 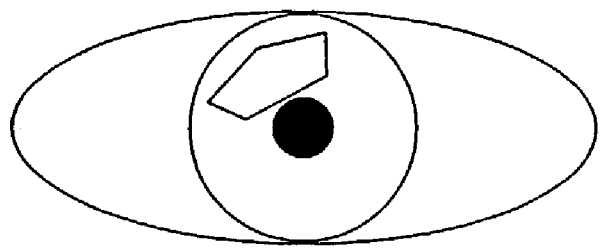
North 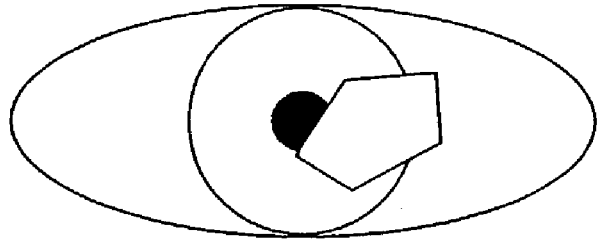

Outer edge of pupil

Outer edge of iris xy rectangular coordinate system

Iris region rθ polar coordinate system

Outer edge of pupil

Outer edge of iris

Angle

PERSONAL AUTHENTICATION METHOD, PERSONAL AUTHENTICATION APPARATUS AND IMAGE CAPTURING DEVICE

BACKGROUND OF THE INVENTION

The present invention relates to a technique for personal authentication utilizing iris images, and more particularly, it relates to a technique to improve the accuracy in iris authentication in outdoor light such as sunlight.

Recently, a technique for personal authentication utilizing iris images has started to be employed for management of entrances/exits of an important institution, authentication of a user of an ATM (Automated Teller Machine) of a bank or the like, authentication for logging in a PC and the like. In general, the iris authentication is performed through the following steps:

1. An iris image of a person is captured with a near-infrared illumination (ex. LED);
2. The iris image is analyzed to extract an iris code; and
3. The extracted iris code is compared with a previously registered iris code, and when a difference (distance) between these codes is not more than a threshold value, the person is authenticated.

In this case, the near-infrared light is used for lighting because it is not perceptible for man and hence does not dazzle the person to be authenticated. In addition, most of the people on the earth have dark brown irises (although some people have blue or gray irises, they are globally minor), and the iris pattern of a dark brown iris is difficult to visually recognize in visible light but its image can be captured with high contrast in the near-infrared light. The iris pattern of a blue or gray iris can be also captured in the near-infrared light.

As described above, the iris authentication has been started to be employed for the management of entrances/exits and the authentication of users of ATMs and for logging in PCs, and in most cases, the iris authentication is employed from a premise that it is performed indoor with a small quantity of near-infrared component of outdoor light. In the case where the iris authentication is performed in outdoor light, such as the sunlight, including a large quantity of near-infrared component, near-infrared light from the sun and the like and near-infrared light reflected by objects irradiated by the sun and the like are widely reflected in the eye. Also, in the case where the face is directly exposed to the sunlight, the shadow of the eyelid or eyelashes may be cast over the iris region. These factors can increase a false rejection rate (FRR). However, it is almost impossible that an obtained iris pattern accidentally resembles an iris pattern of another person due to such reflection and shadow of the eyelid or eyelashes. Therefore, there is little possibility of increase of a false acceptance rate (FAR).

Mostly, the facilities for an ATM is located in the vicinity of the entrance of a building facing on a street. Methods for preventing the influence of the outdoor light are described in patent documents 1 and 2. According to the patent document 1, reflection of the extraneous light is prevented as follows: First polarizing means is provided outside a lens of a camera for capturing an iris image, second polarizing means is provided between an iris authentication apparatus and the source of extraneous light (for example, on a window), and the first and second polarizing means have different polarization directions. Alternatively, according to the patent document 2, the reflection of the extraneous light on an eye is prevented by providing, in a position from which the extraneous light enters the eye (for example, on a window), a non-visible light non-penetrating filter for reflecting or absorbing a non-visible light component lighting the eye out of frequency components of the extraneous light.

As alternative means for preventing the reflection, shielding means such as an eye cup is provided in front of a camera, and a person to be authenticated (hereinafter simply referred to as a user) looks into the shielding means for capturing an image of his/her iris.

Furthermore, patent documents 3, 4, 5 and 6 describe methods for dealing with reflection of lighting means itself used for lighting an eye, which is not the outdoor light.

According to the patent document 3, the head of a user is expected to move while a plurality of iris images are being captured, and the plural iris images are used for reducing the influence of the reflection. First, one image and a registered image are subjected to matching, and a consistent portion therebetween is added to a matching image. Thereafter, the other images are also subjected to the matching with the registered image, so as to successively add consistent portions to the matching image. The ultimate matching image thus formed is compared with the registered image for the authentication.

In all the techniques disclosed in the patent documents 4, 5 and 6, a plurality of lighting means installed in different positions are used. Specifically, an eye is lighted with the plural lighting means at different timings, so as to capture a plurality of iris images respectively at the different lighting timings. A plurality of iris images (or features or comparison results) in which the positions of the reflection of the lighting means are respectively different are synthesized, so as to generate an iris image (or a feature or comparison result) that is free from the influence of the reflection.

Patent document 1: Japanese Laid-Open Patent Publication No. 10-21392

Patent document 2: Japanese Laid-Open Patent Publication No. 2000-185032

Patent document 3: Japanese Laid-Open Patent Publication No. 9-212644

Patent document 4: Japanese Laid-Open Patent Publication No. 10-162146

Patent document 5: Japanese Laid-Open Patent Publication No. 11-203478

Patent document 6: Japanese Laid-Open Patent Publication No. 2001-167252

The aforementioned conventional techniques have, however, the following disadvantages:

The techniques disclosed in the patent documents 1 and 2 are described from a premise of the facilities such as an ATM, and hence, both the techniques need a large-scale apparatuses and need a large cost for practice. Therefore, these techniques are disadvantageously limited in the applicable use.

Also, in the method in which the shielding means such as an eye cup is provided in front of a camera and a user looks into the shielding means for capturing the image of an iris, an advantage of the iris authentication, that is, contactless authentication, is spoiled. Therefore, this method is not preferable from the viewpoint of sanitation and user interface.

Furthermore, the patent document 3 originally describes the countermeasure against not the reflection of the extraneous light but the reflection of the lighting means equipped on the authentication apparatus. Moreover, although the head of a user is expected to naturally move, when the head does not move, the influence of the reflection cannot be reduced and hence the effect cannot be attained. Furthermore, even if the head moves, the user stands in front of the apparatus for the authentication and hence dare not turn his/her eyes largely off the apparatus. Accordingly, there is little possibility that the position of the reflection is changed.

Also, the methods described in the patent documents 4, 5 and 6 using plural lighting means are useful as the countermeasure against the reflection of the lighting means equipped on the authentication apparatus but are useless against the reflection in the outdoor light.

SUMMARY OF THE INVENTION

An object of the invention is, in personal authentication utilizing an iris image, preventing an authentication accuracy from lowering even when extraneous light is reflected on an iris.

In personal authentication of this invention, a plurality of iris images of a person to be authenticated in which the positions of extraneous light reflection are respectively different are captured, and authentication is performed by using the plural iris images and registered iris data.

According to this invention, the authentication can be performed with the influence of the extraneous light reflection reduced by using a plurality of iris images in which the positions of the extraneous light reflection are respectively different. Therefore, personal authentication can be executed even in the outdoor light with the false rejection rate suppressed.

Alternatively, the personal authentication method of this invention includes the steps of extracting iris data corresponding to features for authentication respectively from a plurality of iris images of a person to be authenticated; obtaining a plurality of comparison results by respectively comparing the extracted iris data with registered iris data; and selecting, from the plurality of comparison results, a comparison result with a comparison score not less than a given value or a comparison result with a comparison score not more than a given value, and the authentication is performed on the basis of the selected comparison result.

According to this invention, a comparison result having a comparison score larger or smaller than the given value, namely, a comparison result that is highly probably obtained from the person to be authenticated as a registered person, is selected from the plural comparison results. Therefore, not only the false rejection ratio but also the false acceptance ratio can be suppressed.

Alternatively, the personal authentication method of this invention includes the steps of extracting iris data corresponding to features for authentication respectively from a plurality of iris images of a person to be authenticated; obtaining a plurality of comparison results by respectively comparing the extracted iris data with registered iris data; and obtaining a synthesized comparison result by dividing each of the plurality of comparison results into a plurality of blocks and synthesizing the plurality of comparison results in each of the plurality of blocks, and the authentication is performed on the basis of the synthesized comparison result.

According to this invention, the plural comparison results are synthesized in each block, and therefore, the synthesized comparison result is less affected by noise in the comparison results as compared with the case where they are synthesized in each one-dimensional unit of the feature (that is, one bit in a binary feature). Therefore, a stable comparison result can be synthesized.

Alternatively, the personal authentication method of this invention includes the steps of capturing an iris image of a person to be authenticated; determining, on the basis of the iris image, whether or not extraneous light reflection is caused in the iris image; and capturing a plurality of iris images of the person in which positions of the extraneous light reflection are respectively different and performing authentication by using the plurality of iris images, when it is determined that the extraneous light reflection is caused.

According to this invention, in the case where it is determined that the extraneous light reflection is caused in the iris image obtained from a person to be authenticated as a registered person, a plurality of iris images are captured. Therefore, the person to be authenticated can be free from troublesomeness of always capturing a plurality of iris images.

Alternatively, the personal authentication method of this invention includes the steps of measuring an intensity of near-infrared light in an environment where an iris image is captured; and capturing a plurality of iris images of a person to be authenticated in which positions of extraneous light reflection are respectively different and performing authentication by using the plurality of iris images, when the intensity is not less than a threshold value.

According to this invention, in the case where the intensity of the near-infrared light is so high that the reflection is easily caused, a plurality of iris images are captured. Therefore, the person to be authenticated can be free from the troublesomeness of always capturing a plurality of iris images.

Also, the device of this invention for capturing an iris image for personal authentication, includes a camera; and means for instructing a person to be authenticated on a direction for moving his or her hand holding the device.

Thus, the device instructs the person to be authenticated on the direction for moving the hand, and hence, a plurality of iris images can be easily captured.

The first personal authentication method of this invention includes the steps of capturing, by using an image capturing device, a plurality of iris images of a person to be authenticated in which positions of extraneous light reflection are respectively different; and performing authentication by using the plurality of iris images and registered iris data.

In one aspect of the first personal authentication method, the image capturing device instructs the person on a facing direction in the capturing step.

In another aspect of the first personal authentication method, the image capturing device guides a sight line of the person in the capturing step.

In another aspect of the first personal authentication method, a position of a camera in the image capturing device is changed in the capturing step.

In another aspect of the first personal authentication method, the image capturing device includes a plurality of cameras, and the image capturing device captures the plurality of iris images by using the plurality of cameras in the capturing step.

In another aspect of the first personal authentication method, the image capturing device instructs the person on a direction for moving his or her hand holding the image capturing device in the capturing step.

In another aspect of the first personal authentication method, the authentication step includes the steps of extracting iris data corresponding to features for authentication respectively from the plurality of iris images; obtaining a plurality of comparison results by respectively comparing the extracted iris data with the registered iris data; and obtaining an ultimate comparison score by integrating the plurality of comparison results, and the authentication is performed on the basis of the ultimate comparison score.

In another aspect of the first personal authentication method, the authentication step includes the steps of extracting iris data corresponding to features for authentication respectively from the plurality of iris images; generating integrated iris data by integrating the extracted iris data; and obtaining a comparison result by comparing the integrated iris data with the registered iris data, and the authentication is performed on the basis of the comparison result.

In another aspect of the first personal authentication method, the authentication step includes the steps of generating an integrated iris image by integrating the plurality of iris images; extracting iris data corresponding to a feature for authentication from the integrated iris image; and obtaining a comparison result by comparing the iris data with the registered iris data, and the authentication is performed on the basis of the comparison result.

The second personal authentication method of this invention includes the steps of extracting iris data corresponding to features for authentication respectively from a plurality of iris images of a person to be authenticated; obtaining a plurality of comparison results by respectively comparing the extracted iris data with registered iris data; and selecting, from the plurality of comparison results, a comparison result with a comparison score not less than a given value or a comparison result with a comparison score not more than a given value, and the authentication is performed on the basis of the selected comparison result.

The third personal authentication method of this invention includes the steps of extracting iris data corresponding to features for authentication respectively from a plurality of iris images of a person to be authenticated; obtaining a plurality of comparison results by respectively comparing the extracted iris data with registered iris data; and obtaining a synthesized comparison result by dividing each of the plurality of comparison results into a plurality of blocks and synthesizing the plurality of comparison results in each of the plurality of blocks, and the authentication is performed on the basis of the synthesized comparison result.

The fourth personal authentication method of this invention includes the steps of capturing an iris image of a person to be authenticated; determining, on the basis of the iris image, whether or not extraneous light reflection is caused in the iris image; and capturing a plurality of iris images of the person in which positions of the extraneous light reflection are respectively different and performing authentication by using the plurality of iris images, when it is determined that the extraneous light reflection is caused.

In one aspect of the fourth personal authentication method, the determining step includes the steps of obtaining a comparison result by comparing the iris image with registered iris data; dividing the comparing result into a plurality of blocks and calculating a comparison score of each of the plurality of blocks; and determining that the extraneous light reflection is caused when the number of blocks each having the comparison score not less than a first threshold value is not more than a second threshold value.

The fifth personal authentication method of this invention includes the steps of measuring an intensity of near-infrared light in an environment where an iris image is captured; and capturing a plurality of iris images of a person to be authenticated in which positions of extraneous light reflection are respectively different and performing authentication by using the plurality of iris images, when the intensity is not less than a threshold value.

The personal authentication apparatus of this invention includes an image capturing unit for capturing a plurality of iris images of a person to be authenticated in which positions of extraneous light reflection are respectively different; and an authentication processing unit for performing authentication by using the plurality of iris images captured by the image capturing unit and registered iris data.

In one aspect of the personal authentication apparatus, the image capturing unit includes a camera; and a section for instructing the person on a facing direction.

In another aspect of the personal authentication apparatus, the image capturing unit includes a camera; and a section for guiding a sight line of the person.

In another aspect of the personal authentication apparatus, the image capturing unit includes a camera; and a section for changing a position of the camera with respect to the personal authentication apparatus.

In another aspect of the personal authentication apparatus, the image capturing unit includes a plurality of cameras to be used for capturing the plurality of iris images.

The device of this invention for capturing an iris image for personal authentication, includes a camera; and a section for instructing a person to be authenticated on a direction for moving his or her hand holding the device.

BRIEF DESCRIPTION OF THE DRAWINGS

FIG. 5 is a diagram of iris images captured with the direction of the eye ball (the direction of the sight line) respectively changed;

FIG. 6 is a diagram of iris images captured with the facing direction respectively changed;

DETAILED DESCRIPTION OF THE INVENTION

Preferred embodiments of the invention will now be described with reference to the accompanying drawings.

Herein, "extraneous light" means light other than that of lighting used for capturing iris images and included in an iris authentication apparatus or an image capturing device. Also, "reflection" means a luminance pattern formed due to spatially uneven "extraneous light" in an iris region of a captured iris image.

Embodiment 1

Figure 1:
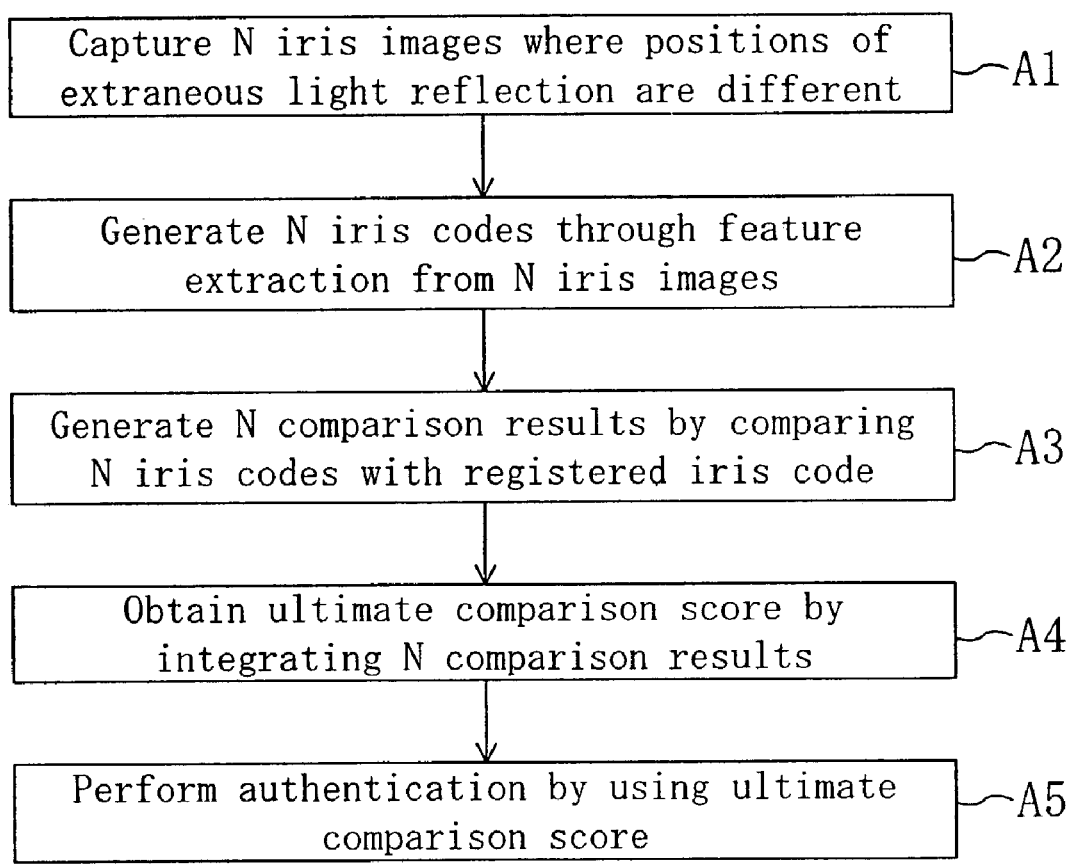
FIG. 1 is a flowchart of a personal authentication method utilizing an iris image according to Embodiment 1 of the invention.
Figure 2:
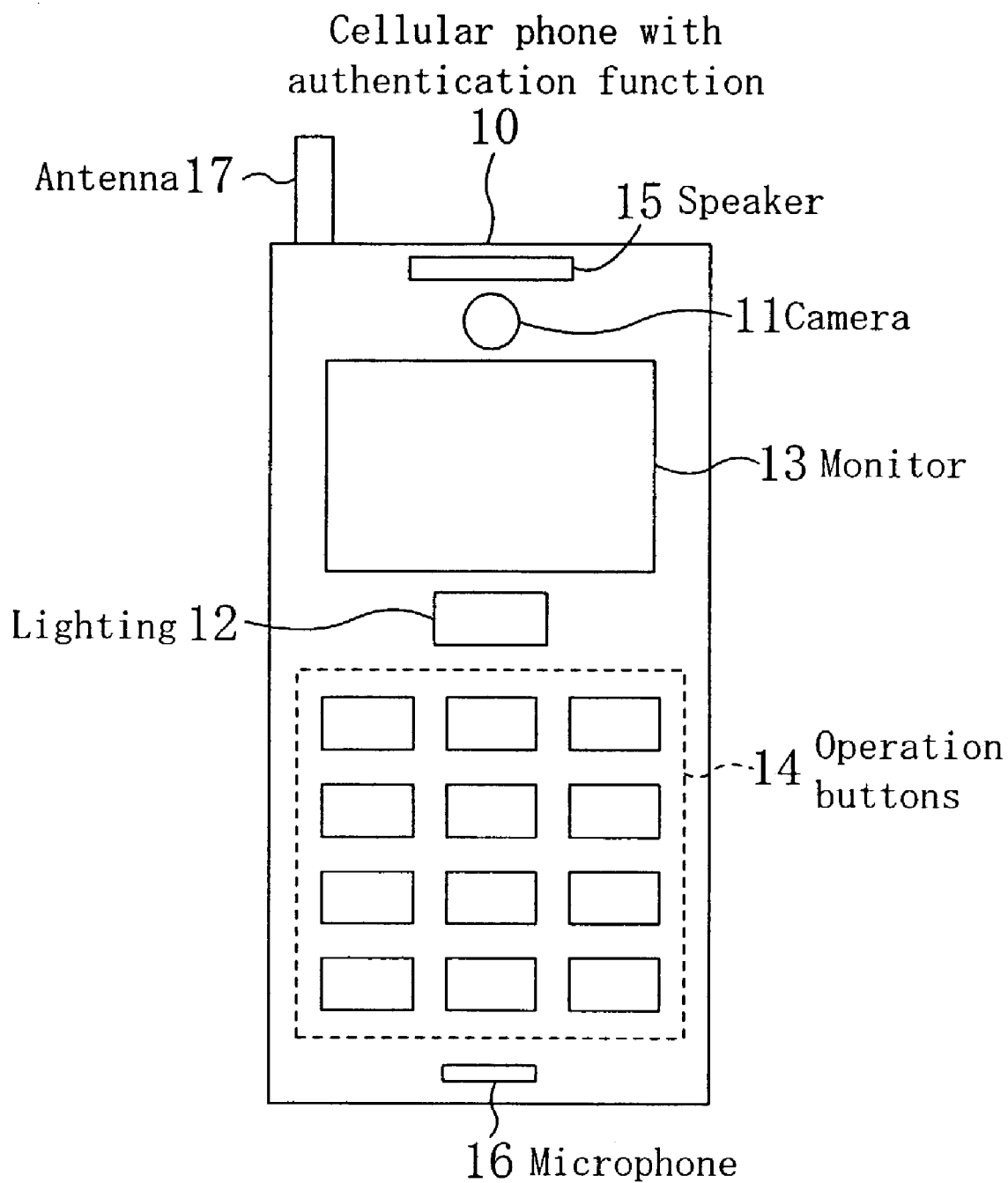
FIG. 2 is a diagram of a cellular phone with an authentication function described as an example of an image capturing device of this invention.
Figure 3:
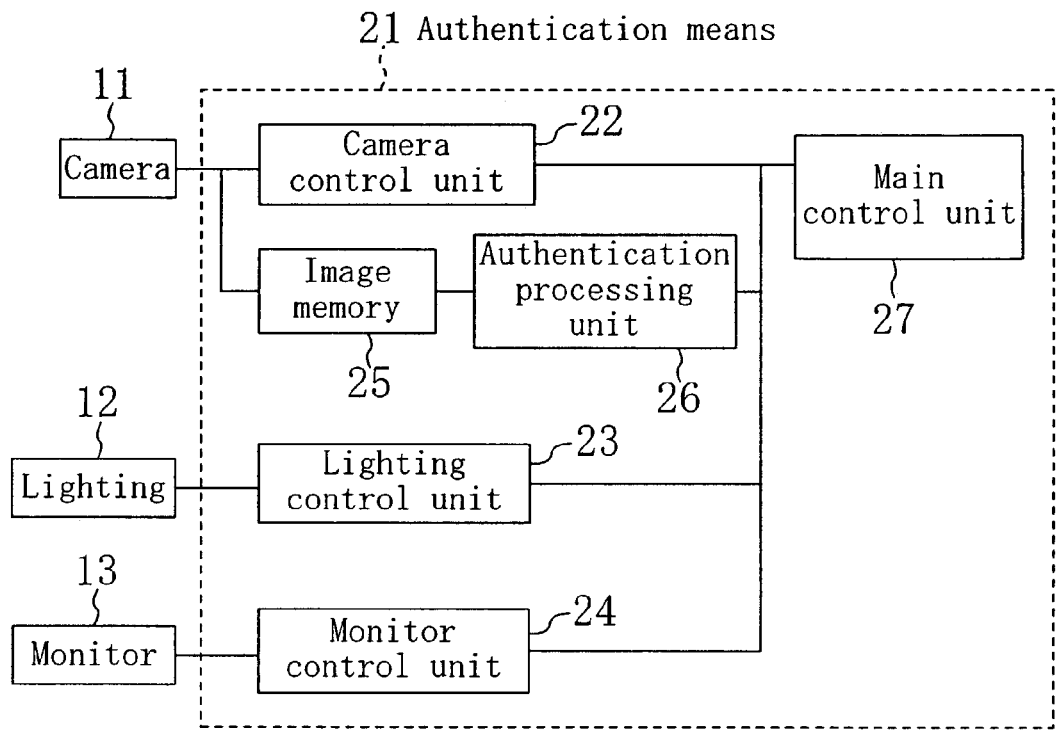
FIG. 3 is a schematic diagram of the internal arrangement of the cellular phone of FIG. 2.

FIG. 1 is a flowchart of a personal authentication method utilizing iris authentication according to Embodiment 1 of the invention. FIG. 2 is a diagram for showing the appearance of a cellular phone with an authentication function described as an example of an image capturing device to be used in practicing the personal authentication method of this embodiment, and FIG. 3 is a diagram for showing the internal arrangement of the cellular phone with the authentication function of FIG. 2. It is assumed in this embodiment that a user (a person to be authenticated) performs the iris authentication in outdoor light by using the cellular phone with the authentication function as shown in FIG. 2.

In the cellular phone 10 with the authentication function of FIG. 2, a camera 11 for capturing an iris image and lighting 12 are additionally provided to a general cellular phone. This cellular phone 10 includes, in addition to the camera 11 and the lighting 12, a monitor 13, operation buttons 14, a speaker 15, a microphone 16, an antenna 17 and the like. One or a plurality of near-infrared LEDs are used as the lighting 12. The lighting of the near-infrared light is used so as not to dazzle a user and so as to capture a dark brown iris pattern with high contrast. The camera 11 is provided with a visible light cut filter so as to receive a near-infrared component alone. On the monitor 13, an iris image to be captured and an authentication result are displayed. In the case where an iris image is captured in light including a large quantity of near-infrared component, such as light from the sunlight and an incandescent lamp, there is no need to always provide the lighting, and when it is provided, there is no need to always light it.

Also, in the internal arrangement shown in FIG. 3, a camera control unit 22, a lighting control unit 23 and a monitor control unit 24 are connected to a main control unit 27 in authentication means 21. The camera control unit 22 controls the camera 11 to capture an iris image, and captured iris images are stored in an image memory 25. An authentication processing unit 26 performs authentication processing by using the iris images stored in the image memory 25. The lighting control unit 23 controls the lighting 12 so as to light an iris region in synchronization with timing of capturing each image. The monitor control unit 24 controls a display screen of the monitor 13.

Now, processing performed in the personal authentication method of this embodiment will be described in accordance with the flow shown in FIG. 1.

First, a user holds the cellular phone 10 with the authentication function shown in FIG. 2, and captures, in the outdoor light, a plurality of (N) iris images in which positions of extraneous light reflection are respectively different (A1). In capturing the images, the user holds the cellular phone 10 in a position away from his/her eye by a predetermined distance (of, for example, approximately 20 cm when the camera 11 has a single focus), and while confirming an iris image captured by the camera 11 and displayed on the monitor 13, adjusts the position of the eye so that the entire iris region can be included in the viewing field and be in focus. Thereafter, he/she presses a camera button for capturing allocated to one of the operation buttons 14. This operation is repeated N times so that the positions of the extraneous light reflection are different in the respective images. Alternatively, after pressing a camera start button once, N frame images can be continuously captured by obtaining an image sequence.

At this point, the phenomenon of extraneous light reflection will be described in detail.

Figure 4:
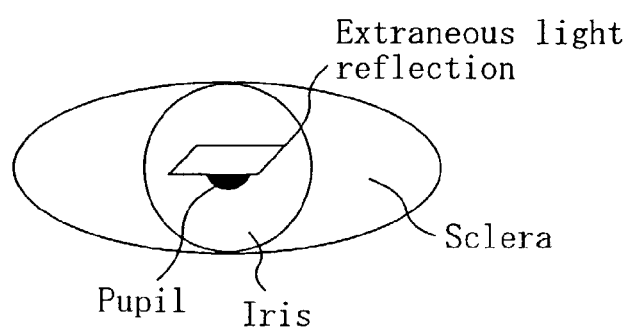
FIG. 4 is a diagram of an iris image in which extraneous light is reflected in an iris region.

As shown in FIG. 4, in an iris image captured in the outdoor light, the extraneous light is reflected over a wide region. This is because a near-infrared component included in the sunlight (which is an electromagnetic wave with a wide frequency band including UV, visible light, near-infrared light, far infrared light and the like) has large strength, and hence, not only the near-infrared component of the direct sunlight but also near-infrared components reflected from a large number of objects irradiated with the sunlight enter the eye from various angles. (Since an eye ball has a shape close to a sphere, the reflection can be easily caused.)

The position of the extraneous light reflection is determined depending upon the positional relationship between the light source (including the reflecting object), the camera and the eye ball, and therefore, one of them is moved to change the position of the reflection. Among them, the light source is difficult to move, and hence, one or both of the camera and the eye ball are moved.

FIG. 5 shows four exemplified iris images captured with the positions of the camera and the face fixed and the direction of the eye ball (the direction of the sight line) alone changed. Also, FIG. 6 shows four exemplified iris images captured with the relative positional relationship between the camera and the eye ball fixed and the facing direction changed among the north, south, east and west. As is understood from FIG. 5, when the eye ball is moved (namely, the direction of the sight line is changed), the position of the reflection with respect to the iris region is changed. Also, as is understood from FIG. 6, the shape of the reflection is changed as the facing direction is changed.

In this embodiment, in order to capture a plurality of iris images in which the positions of the extraneous light reflection are respectively different, the device as shown in FIG. 2 is used for instructing the user on the facing direction or guiding the direction of the sight line of the user. For example, the facing direction is displayed on the monitor 13 with an arrow (in which case the monitor 13 and its control unit correspond to means for instructing the facing direction), the facing direction is instructed with a voice from the speaker 15 (in which case the speaker 15 and its control unit correspond to the means for instructing the facing direction), or a specific image such as the image of a character is displayed on the monitor 15 so as to move the image to a direction for guiding the sight line (in which case the monitor 13 and its control unit correspond to means for guiding the sight line). In this manner, the user can easily grasp without being confused in which direction he/she should turn his/her face or gaze in capturing images, and thus, the device can provide a user-friendly interface. Thus, the plural iris images in which the positions of the extraneous light reflection are respectively different can be easily captured.

The following processing A2 through A5 are executed by the authentication processing unit 26. Herein, a method disclosed in National Publication of translated version No. 8-504979 (International Publication No. WO94/09446, hereinafter referred to as the reference document 1) is employed. The iris authentication method of the reference document 1 is performed roughly through the following steps:

(1) The outer edge of an iris (the boundary between an iris and a sclera) and the outer edge of a pupil (the boundary between a pupil and the iris) are determined so as to cut an iris region out.

(2) The cut iris region is converted from an xy rectangular coordinate system to an rθ polar coordinate system.

(3) Analysis zones are determined (by dividing the iris region into 8 ring-shaped zones in the radial direction).

(4) A 2-d Gabor filter of multi-scale is applied, and a signal output from the Gabor filter is binarized to obtain an iris code.

(5) A registered iris code previously registered is compared with the iris code obtained in the authentication (through exclusive OR), so as to calculate a hamming distance between the two codes.

(6) When the hamming distance is not more than a threshold value, the user is authenticated to accept, and otherwise, the user is rejected as another person.

Figure 7:
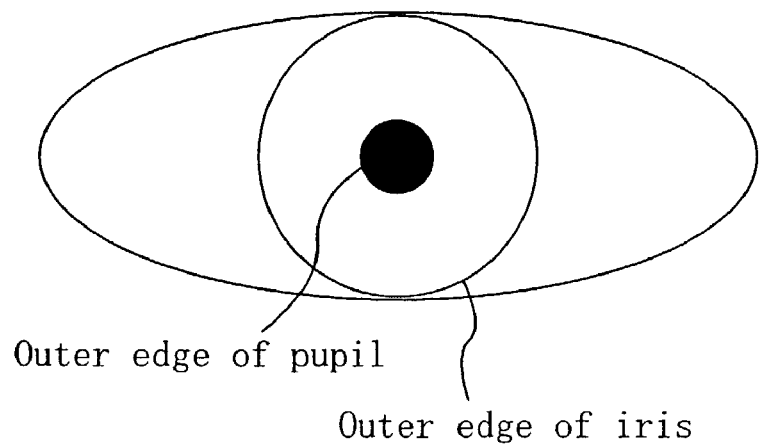
FIG. 7 is a diagram for showing the outer edge of a pupil and the outer edge of an iris.
Figure 8:
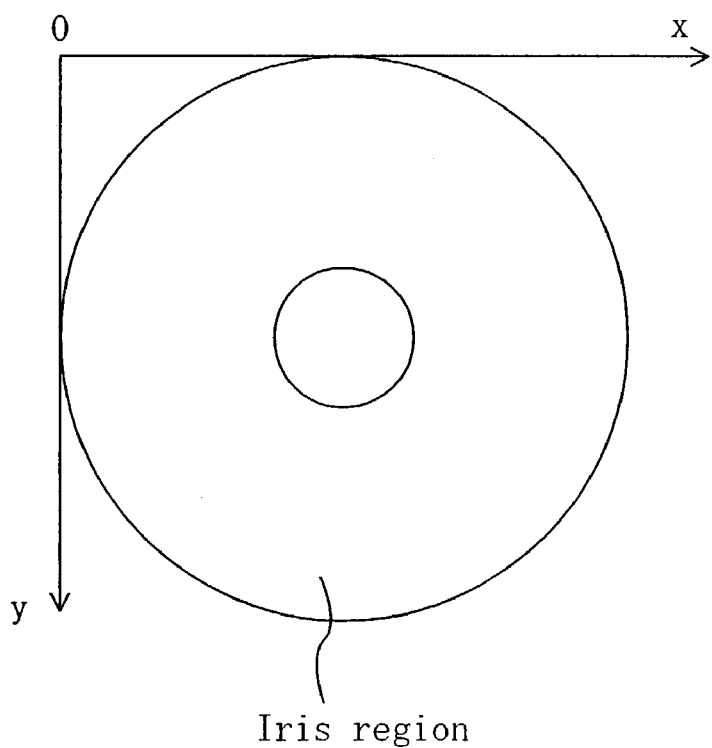
FIG. 8 is a diagram of an iris image expressed by using an xy rectangular coordinate system.
Figure 9:
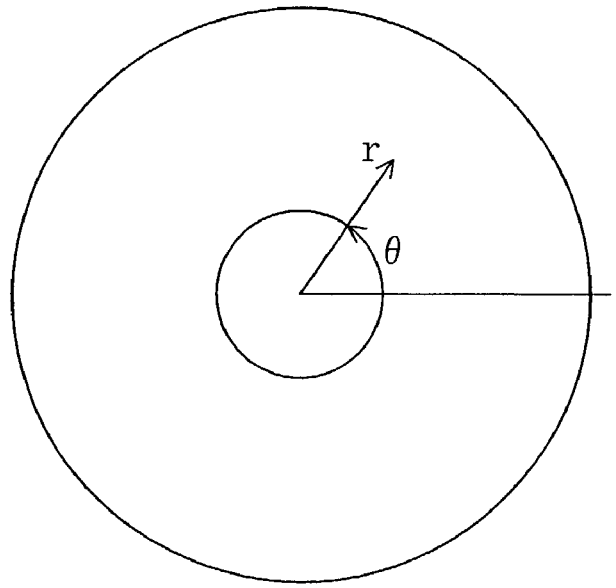
FIG. 9 is a diagram of an iris image expressed by using an r$\theta$ polar coordinate system.

FIG. 7 is a diagram for showing the positions of the outer edge of an iris and the outer edge of a pupil, and FIG. 8 is a diagram, expressed by using the xy rectangular coordinate system, of a region surrounded between the outer edge of the iris and the outer edge of the pupil cut out as the iris region. At this point, the influence of parallel movement of the iris region is absorbed. Also, FIG. 9 is a diagram of the iris region expressed by using the rθ polar coordinate system with the center of the pupil set as the center of the coordinate (obtained through the conversion in step (2)). The actual outer edges of an iris and a pupil are not accurately circular, but if they are approximated to a circle, the center of the pupil and the center of the iris are not concentric (but eccentric). However, when a value in the redirection is set to 0 on the outer edge of the pupil and to 1 on the outer edge of the iris, the eccentricity, a difference in the dilation of the pupil and the influence of expansion/reduction can be absorbed.

Figure 10:
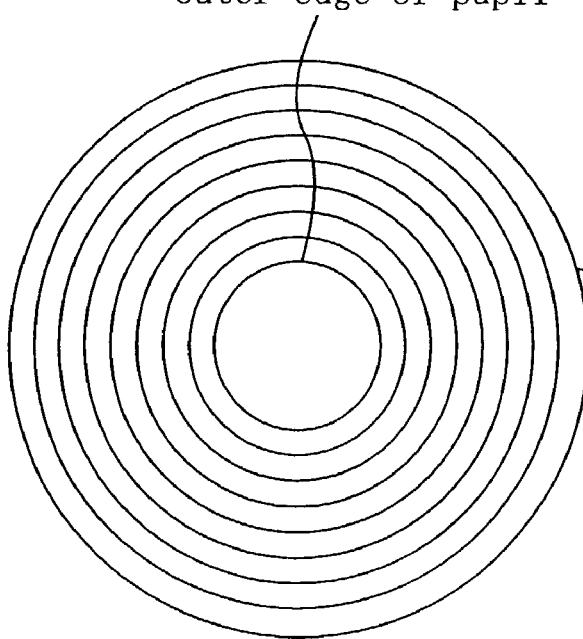
FIG. 10 is a diagram for showing analysis zones obtained by dividing an iris into eight ring-shaped portions.
Figure 11A:
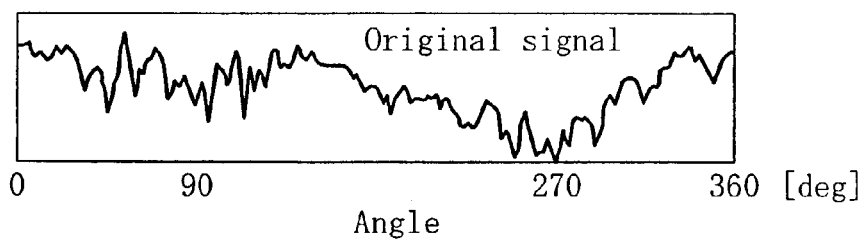
FIGS. 11A, 11B and 11C are diagrams for showing a method for generating an iris code.
Figure 11B:
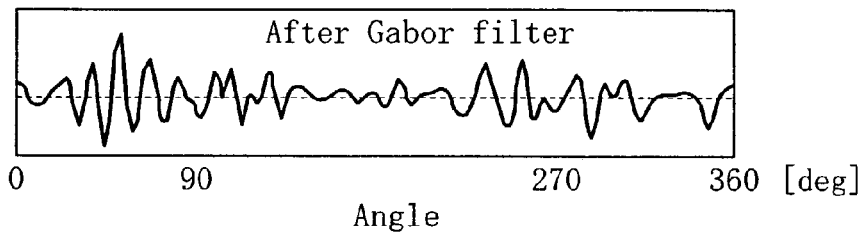
Figure 11C:
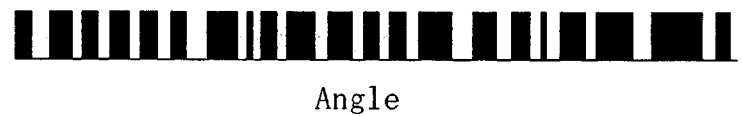

FIG. 10 is a diagram of the 8 ring-shaped analysis zones determined in step (3). FIGS. 11A through 11C are diagrams for showing generation of the iris code in step (4). A luminance signal as shown in FIG. 11A is obtained after determining the analysis zones, the Gabor filter is applied to give a signal as shown in FIG. 11B and this signal is binarized as shown in FIG. 11C. Although the signal is actually two-dimensional, it is herein shown as a one-dimensional signal for simplification.

FIG. 11A shows an angular direction luminance signal obtained in one of the 8 ring-shaped zones. The Gabor filter of multi-scale is actually applied, and there are a real part and an imaginary part even in a Gabor filter of single-scale. FIGS. 11B and 11C show the signals obtained by applying a real part of the Gabor filter of a given scale. The position of each bit in the iris code shown in FIG. 11C resulting from the binarization can be made to correspond to a given position in the iris image.

First, the captured N iris images are subjected to feature extraction, so as to respectively generate N iris codes as iris data corresponding to features for the authentication (A2). In the processing A2, the aforementioned steps (1) through (4) are performed on each of the N iris images in which the positions of the extraneous light reflection are respectively different, so as to generate the N iris codes. At this point, when steps (1) through (3) are performed on each image, an iris code in which the influences of the parallel movement, the expansion/reduction, the difference in the dilation of the pupil and the eccentricity of the pupil are absorbed is generated with respect to each iris region of the plural iris images.

Next, the N iris codes are respectively compared with the registered iris code previously registered as registered iris data of the user, so as to obtain N comparison results (A3). In each embodiment of this invention, corresponding bits are compared between the two iris codes, so as to generate, as the "comparison result", a bit string showing match/mismatch between the compared bits. Since an XOR operation is used for comparing the bits, when they match, "0" is given as a bit value, and when they do not match, "1" is given as a bit value. Also, such a bit value expressing the match/mismatch is used as a "determination result".

Figure 12:
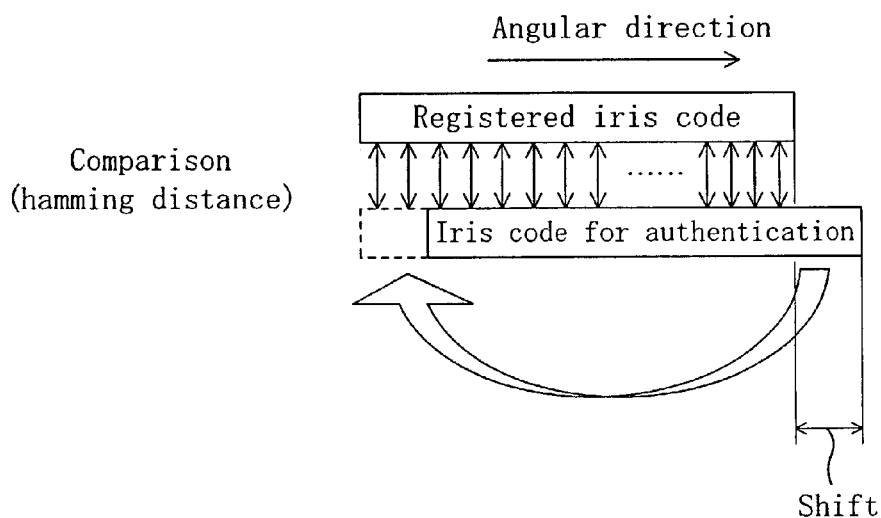
FIG. 12 is a diagram for showing a method for comparing two iris codes with rotation compensation.

In the processing A3, the above-described step (5) is performed. At this point, there may be a shift in the angular direction derived from the inclination of the face or the rotation of the eye ball between the registered iris code and the iris code for authentication. In order to compensate this shift, the iris code for authentication is rotated in a previously determined range for matching, so that the minimum hamming distance can be obtained as the ultimate hamming distance. This processing is shown in FIG. 12. In FIG. 12, for the sake of simplification, a real part of the Gabor filter of a given scale is applied for the analysis, and one of the 8 ring-shaped zones is shown.

Figure 13:
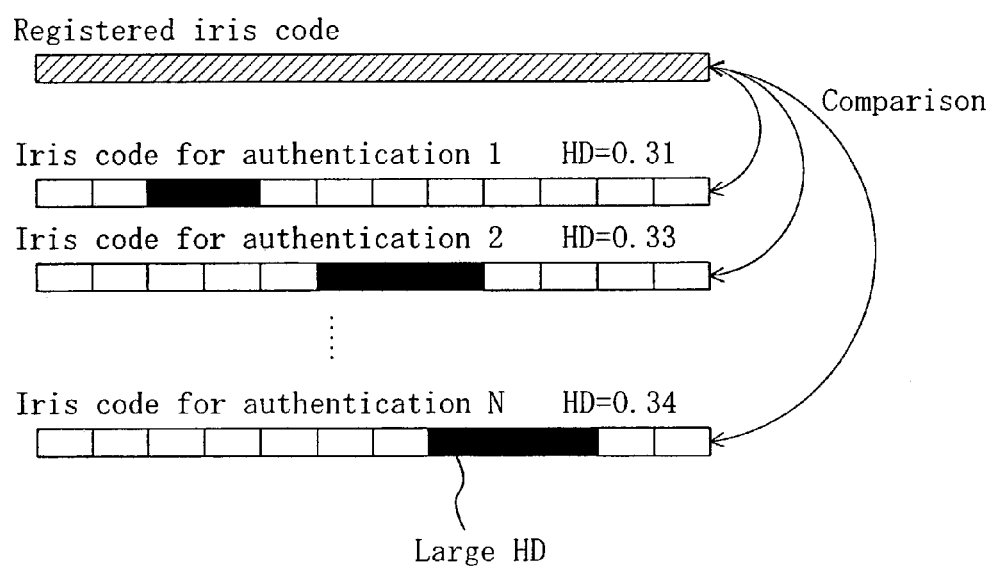
FIG. 13 is a diagram for showing a result of comparison of N iris codes with a registered iris code.

FIG. 13 is a diagram for showing the result of the comparison between the registered iris code and the N iris codes for authentication. The iris codes 1 through N for authentication shown in FIG. 13 have already been subjected to the rotation compensation matching so as to be shifted to positions for minimizing the hamming distances. Specifically, the ith bit positions in the codes all correspond to the same position in the iris pattern. Also, in FIG. 13, each iris code for authentication is divided into M blocks, and a block having a hamming distance larger than a predetermined threshold value TH2 (of 0.30 in this embodiment) is shown as a black block.

According to the comparison result shown in FIG. 13, the iris codes 1, 2 and N for authentication respectively have hamming distances of 0.31, 0.33 and 0.34. A hamming distance is 0.5 when two codes are not correlated with each other at all. Hamming distances obtained between two different persons are distributed around 0.5, but a hamming distance is shifted to be slightly smaller when the rotation compensation matching is performed. In the case where a threshold value TH1 of the hamming distance for the authentication is 0.30, these iris codes for authentication are all rejected when singly used.

However, as shown in FIG. 13, although the hamming distances of the most blocks are not more than the threshold value TH2, the hamming distance HD of the entire iris code for authentication is larger than the threshold value TH1 because merely some blocks (the black blocks) have large hamming distances. It seems that these blocks have the large hamming distances HD because of the extraneous light reflection.

Therefore, in this embodiment, a plurality of comparison results are synthesized and integrated to generate an ultimate comparison score (A4). Thus, in the case where the positions of the extraneous light reflection are respectively different in the plural iris images, the influence of the extraneous light reflection on the accuracy in the personal authentication can be eliminated. Herein, a "comparison score" means a scholar value representing the matching degree resulting from the comparison between two iris codes. In each embodiment of the invention, a ratio in the number of mismatch bits to all compared bits, namely, the hamming distance, is used as the "comparison score".

For the integration of the comparison results, the comparison results may be synthesized in each bit or in each block.

<Synthesis in Each Bit>

Figure 14:
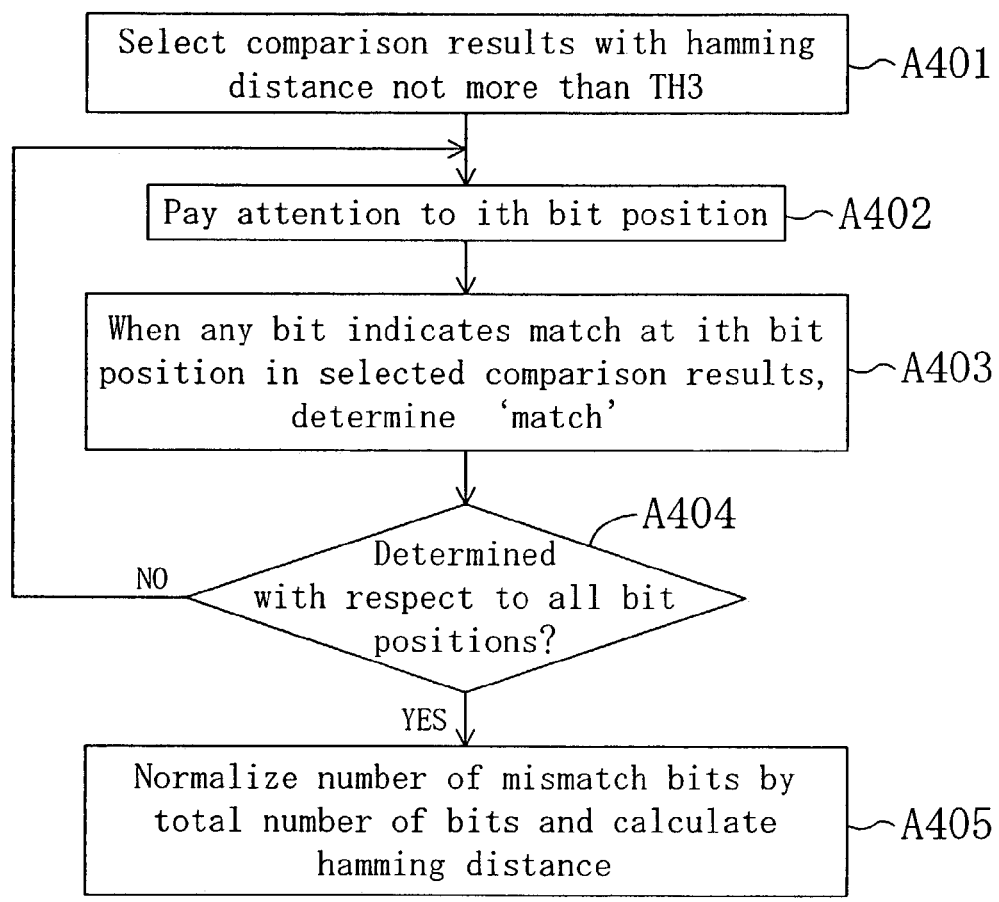
FIG. 14 is a flowchart of processing A4 of FIG. 1 performed in synthesis in each bit.

FIG. 14 is a flowchart of detailed procedures in the processing A4 performed when the comparison results are synthesized in each bit. In FIG. 14, comparison results each having a hamming distance not more than a predetermined threshold value TH3 (>TH1) are first selected from the N comparison results (A401). Next, attention is paid to the ith bit position (A402), and if any bit in the attended bit position of the selected comparison results matches with the corresponding one of the registered iris code, the ultimate determination result of that bit position is determined to match (A403). These procedures of steps A402 and A403 are executed on all the bit positions (A404). The number of ultimately mismatch bits is normalized with the total number of bits, so as to calculate a hamming distance as the ultimate comparison score (S405).

At this point, in the case where a person who is not the registered person captures his/her N (which is a large number) iris images, the probability that any one of the N iris codes matches with the registered iris code in a given bit position is closer to "1" (because the probability of match/mismatch is 0.5 when there is no comparison between two codes). This also applies to the case where a plurality of persons who are not the registered person capture N iris images by turn. Therefore, if all the comparison results obtained from the plural iris images are used for the authentication, the probability that a person who is not the registered person is authenticated by mistake is increased.

Accordingly, in step A401, a comparison result having a hamming distance larger than the threshold value TB3 is excluded for the following steps because it is highly probably obtained from an iris image of a person who is not the registered person. Specifically, merely comparison results each having a hamming distance larger than the threshold value TH1 for the authentication and smaller than the predetermined threshold value TH3 are accepted for the following steps under interpretation that "the hamming distance exceeds the threshold value TH1 because there is extraneous light reflection in the iris image of the registered person". In this manner, the increase of the false acceptance ratio (FAR), that is, a ratio of authenticating a person not to be authenticated by mistake, can be suppressed. In the case where an index that has a large value when there is high comparison and has a small value when there is low comparison is used instead of the hamming distance, comparison results each having a score not less than a predetermined value are selected in step A401.

Also, in step S403, for example, with respect to the attended bit position, the N comparison results may be subjected to a majority decision in the match/mismatch, so that the major result can be regarded as the ultimate determination result of that bit position. Alternatively, the ultimate determination result of the attended bit position may be determined depending upon whether or not the ratio of matches in the N comparison results is larger than a predetermined threshold value. Further alternatively, with respect to the attended bit position, the ratio of matches in the N comparison results is obtained as a score of that bit position, so that an average of the scores of all the bit positions can be obtained as the ultimate comparison score.

Furthermore, with respect to the attended bit position, a weighted average of the N comparison results may be used for obtaining the ultimate determination result of that bit position. An example of the specific method is as follows:

First, a weight $w_k$ ($0 \leq w_k \leq 1$; wherein k is a comparison result number) that increases as the reliability of a comparison result is higher is prepared. For example, the weight is defined by the following equation (5):

$$w_k = \frac{\frac{1}{x_k}}{\sum_{j=1}^{N} \frac{1}{x_j}} \quad (5)$$

wherein $x_k$ is a hamming distance of the kth comparison result. In other words, a comparison result with a smaller hamming distance is judged to have high reliability and hence is provided with a larger weight. In this equation, the denominator is a normalized term for making the sum of the weights $w_k$ to be 1.

Then, a value $r_i$ of the ith bit of a synthesized comparison result is determined by using the following equation (6):

$$r_i = \begin{cases} 0 \ldots \text{if } \sum_{k=1}^{N} w_k \cdot r_{k,i} < 0.5 \\ 1 \ldots \text{otherwise} \end{cases} \quad (6)$$

wherein $r_{k,j}$ is a value of the ith bit of the kth comparison result. In this example, the common weight $w_k$ is used for all the bit positions of the kth comparison result.

Alternatively, different weights may be used for the respective bit positions as follows:

First, a weight $w_{k,i}$ ($0 \leq w_{k,i} \leq 1$; k is a comparison result number; and i is a bit position) that increases as the reliability of a comparison result is higher is prepared. For example, the weight is defined by using the following equation (7):

$$w_{k,i} = \frac{\frac{1}{x_{k,i}}}{\sum_{j=1}^{N} \frac{1}{x_{j,i}}} \quad (7)$$

wherein $x_{k,i}$ is a local hamming distance in the vicinity of the ith bit of the kth comparison result. The word "local" means being local on the iris image. In other words, a bit value $r_{k,i}$ with a small local hamming distance is judged to have high reliability and hence is provided with a large weight. In this equation, the denominator is a normalized term for making the sum of the weights $w_{k,i}$ with respect to k to be 1.

Then, a value $r_i$ of the ith bit of a synthesized comparison result is determined by using the following equation (8):

$$r_i = \begin{cases} 0 \ldots \text{if } \sum_{k=1}^{N} w_{k,i} \cdot r_{k,i} < 0.5 \\ 1 \ldots \text{otherwise} \end{cases} \quad (8)$$

Also, in the equation (7), $x_{k,i}$ may be a luminance value (of a point or a local area) on the iris image corresponding to the ith bit of the kth comparison result. In other words, a bit corresponding to a portion with a large luminance value is judged to highly probably have an unstable value due to the reflection and have low reliability, and hence is provided with a smaller weight.

Needless to say, another weight apart from those described above may be used as far as it has a larger value as the reliability of the corresponding bit is higher.

<Synthesis in Each Block>

Figure 15:
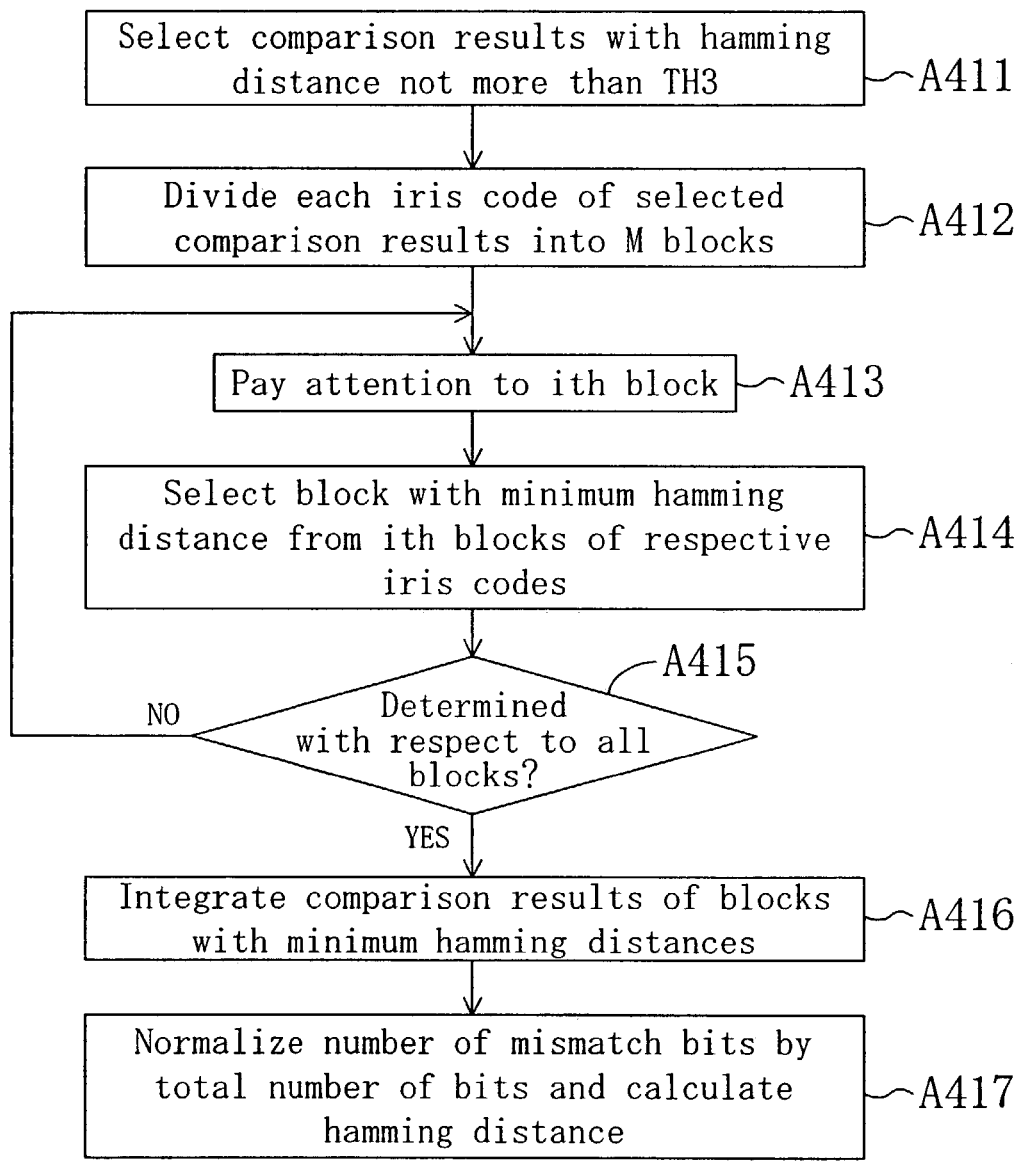
FIG. 15 is a flowchart of the processing A4 of FIG. 1 performed in synthesis in each block.
Figure 16A:
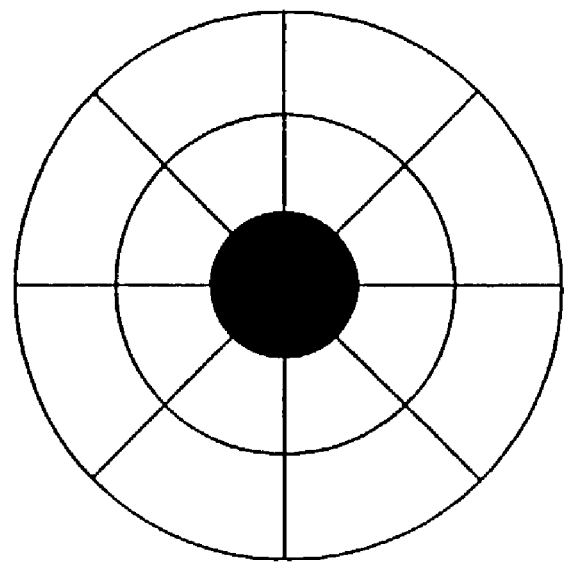
FIGS. 16A and 16B are diagrams for showing a method for dividing an iris region of an iris image into blocks.
Figure 16B:
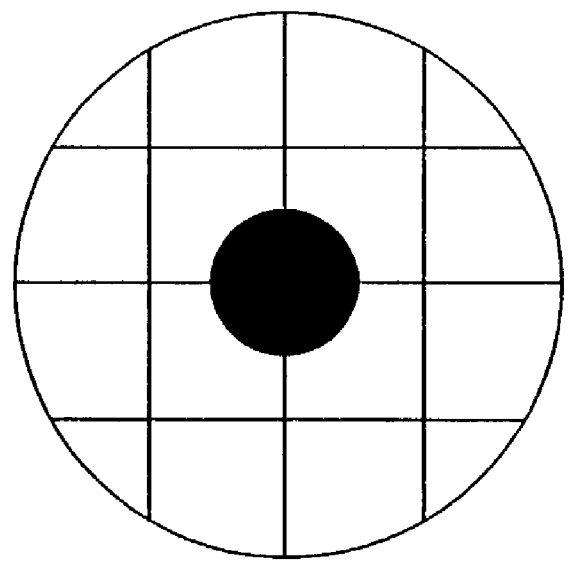

FIG. 15 is a flowchart for showing detailed procedures in the processing A4 performed in synthesizing the comparison results in each block. In FIG. 15, comparison results each having a hamming distance not more than the predetermined threshold value TH3 (>TH1) are first selected from the N comparison results (A411). Next, the iris code for authentication obtained from each of the selected comparison results is divided into M blocks (A412). The block division is performed as follows: The iris image is previously divided, and when pixels corresponding to bits of the iris code belong to the same block in the iris image, these bits of the iris code are made to belong to the same block. The iris image is divided, for example, concentrically and radially as shown in FIG. 16A or rectangularly as shown in FIG. 16B.

Next, attention is paid to the ith block (A413), and a block with the minimum hamming distance is selected from the attended blocks of the respective iris codes (A414). These procedures of steps A413 and A414 are executed on all the blocks (A415).

Thereafter, comparison results of the blocks with the minimum hamming distances are all integrated (A416). A comparison result of a block is a bit string showing the match/mismatch of the corresponding bits belonging to the block between two iris codes. Then, the number of ultimately mismatch bits is normalized with the total number of bits, so as to calculate a hamming distance as the ultimate comparison score (A417).

In this synthesis in each block, the effect obtained in step A411 is the same as that obtained in step A401 of the synthesis in each bit.

Referring to FIG. 1 again, the authentication is performed by using the ultimate comparison score (hamming distance) (A5). When the hamming distance is not more than the predetermined threshold value TH1, the user is authenticated to accept, and otherwise, the user is rejected as another person. Then, the ultimate authentication result is displayed on the monitor 13 of the cellular phone 10 with the authentication function of FIG. 2.

The procedure in step A417 in the synthesis in each block and the processing A5 may be combined. In this case, in the comparison result integrated in step A416, all the hamming distances within the respective blocks are not more than the predetermined threshold value TH2 ($\geq$TH1), the user is authenticated to accept, and otherwise, the user is rejected as another person.

As described so far, since the images are captured with the position of the face, the eye ball or the camera moved in this embodiment, a plurality of iris images in which the positions of the extraneous light reflection are respectively different can be captured. Since the image capturing device instructs a user on the direction of the face or the sight line (eye ball), the device with good user interface can be provided.

Furthermore, since the ultimate comparison score is obtained by integrating a plurality of comparison results, the influence of the extraneous light reflection or the shadow of the eyelid or eyelashes on the authentication accuracy can be reduced. Moreover, when the comparison results are integrated in each block, it is possible to avoid accepting a person who is not the registered person to be authenticated. Also, since comparison results with hamming distances larger than the predetermined threshold value are not used, it is possible to avoid accepting a person who is not the registered person to be authenticated.

Figure 17:
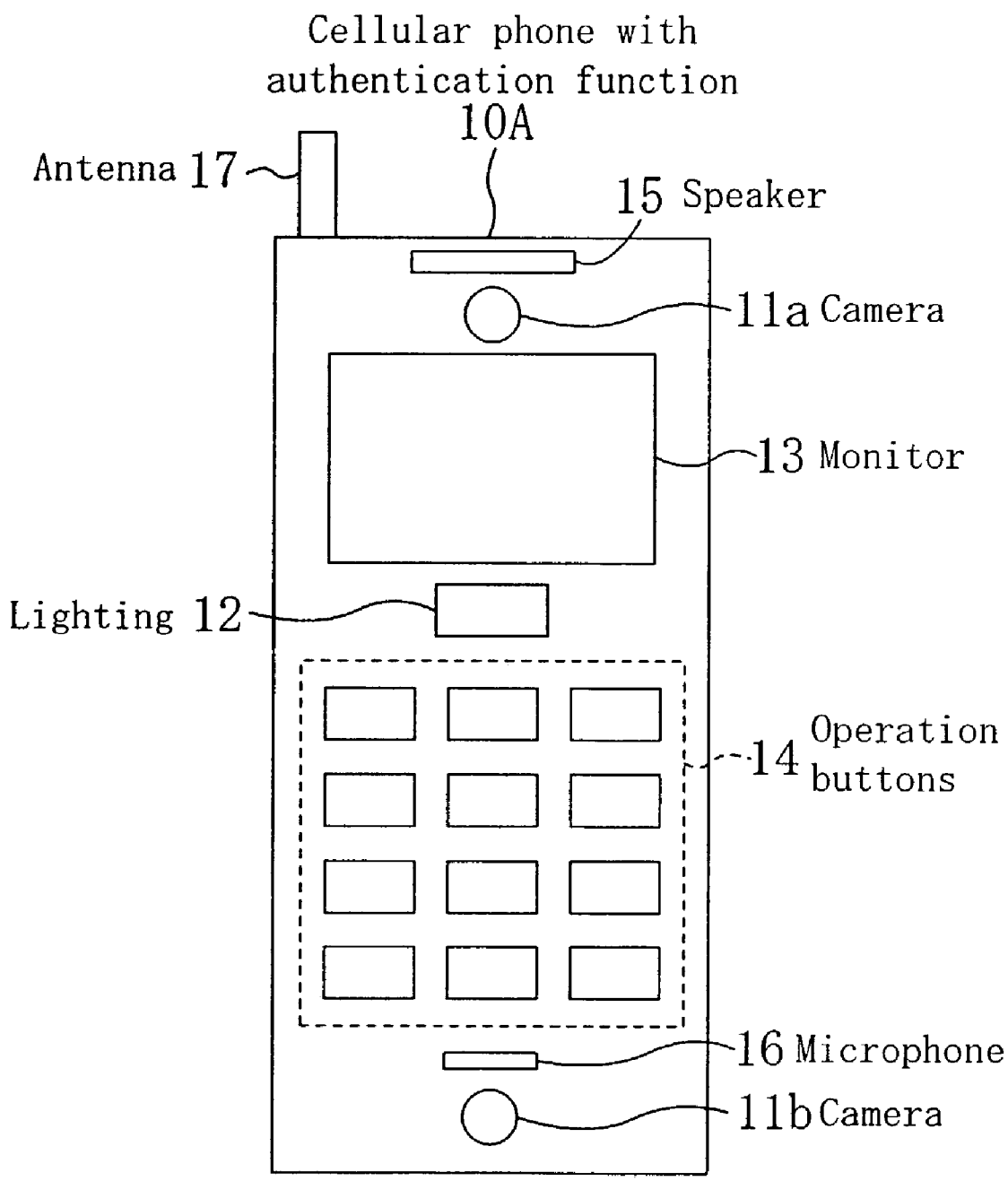
FIG. 17 is an outline diagram of a cellular phone with an authentication function equipped with a plurality of cameras.

In addition, as a method for capturing a plurality of iris images in which the positions of the extraneous light reflection are respectively different, an image capturing device including a plurality of cameras is used for capturing images of an iris simultaneously or at different timing from a plurality of angles. FIG. 17 shows the appearance of a cellular phone with the authentication function including a plurality of cameras usable as the image capturing device of the invention. In the cellular phone shown in FIG. 17, two cameras 11a and 11b are provided in positions away from each other in the vertical direction. When this cellular phone is used, two iris images in which the positions of the extraneous light reflection are different can be captured at one time. Such an operation is performed once or repeated a plurality of times. Needless to say, when a device including cameras in number larger than 2 is used, a larger number of iris images in which the positions of the extraneous light reflection are respectively different can be captured through one operation.

Figure 18:
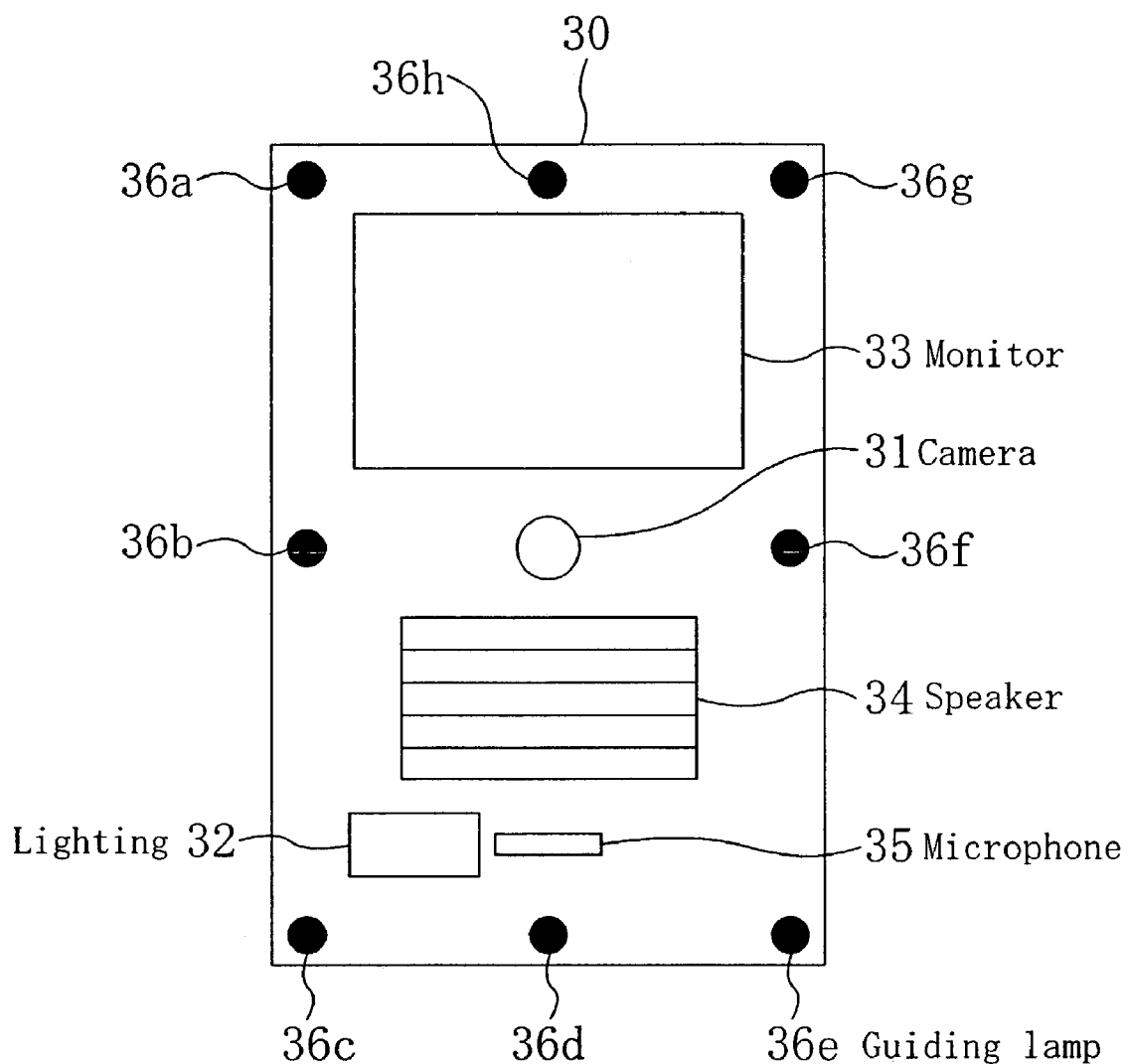
FIG. 18 is an outline diagram of a door phone with an authentication function equipped with guiding lamps.

FIG. 18 shows the appearance of a fixed type door phone with an iris authentication function to be installed at the entrance of a house or the like that is usable as the image capturing device of this invention. The door phone 30 of FIG. 18 is provided with a plurality of guiding lamps 36a through 36h serving as means for guiding the direction of the sight line of a user. In capturing iris images, the guiding lamps are successively lighted one by one in a predetermined order, so that the user can turn his/her eye toward the lighted guiding lamp for capturing each iris image. When targets for guiding the sight line are thus provided on the image capturing device, a user can easily grasp in which direction he/she should turn his/her eye, and can be prevented from being largely troubled in moving the sight line. Thus, the device attains a user friendly interface.

Furthermore, the image capturing device may instruct a user to change the position of the image capturing device itself including a camera. In the case where a user uses, as the image capturing device, for example, the cellular phone 10 with the authentication function shown in FIG. 2, the image capturing device instructs the user on the direction for moving his/her hand holding the image capturing device. In this case, the instruction may be given by displaying a message or an arrow on the monitor 13 (in which case the monitor 13 and its control unit correspond to means for instructing on the direction for moving the hand), or the instruction may be given with a voice from the speaker 15 (in which case the speaker 15 and its control unit correspond to the means for instructing on the direction for moving the hand).

Furthermore, the image capturing device may be provided with a camera variable in its position, so that the position of the camera can be changed automatically or manually by a user in capturing an iris image. Thus, with the image capturing device at the ready merely once, iris images can be captured from different angles owing to the movement of the camera itself. Accordingly, a plurality of iris images can be easily captured.

In the case where an iris image is captured front ways with merely the eye ball moved, if the eye ball is largely moved, the iris is shot in an oblique direction, and hence, the outer edge of the iris (and the outer edge of the pupil) is in an elliptical shape in the resultant iris image. In such a case, it is necessary to correct distortion in the input image so as to convert it into an iris image taken front ways before performing the subsequent processing. The distortion correction can be realized through linear transformation (matrix calculation).

This embodiment is particularly useful in the authentication performed in the outdoor light, and the intensity of the near-infrared light of the outdoor light is much higher than the power of the lighting 12, and hence, the effect of the lighting 12 is minimal. Therefore, the image capturing device may be provided with a switch for turning on/off the lighting 12, so that the lighting 12 can be turned off when the authentication is performed in the outdoor light. Alternatively, the image capturing device may be provided with a near-infrared light intensity sensor so that the lighting 12 cannot be lighted in capturing iris images when the near-infrared light intensity of the outdoor light exceeds a predetermined threshold value.

In this embodiment, all the processing A1 through A5 are performed on the terminal. Instead, the processing A1 for capturing a plurality of iris images alone may be performed on the terminal, and the plural images are sent to a server via a network, so that the processing A2 through A5 can be performed on the server. In this case, the authentication result is calculated on the server, and the calculation result is sent to the terminal via the network again, so as to display the authentication result on the monitor 13 of the terminal.

In this embodiment, the authentication is performed after capturing N (a fixed number of) images in which the positions of the extraneous light reflection are respectively different. Instead, the aforementioned processing may be performed after capturing each image so as to calculate the ultimate hamming distance, and when the hamming distance is not more than the predetermined threshold value, the authentication may be completed, and otherwise, the next image may be captured. In this case, the upper limit of the number of images to be captured may be set.

Figure 25:
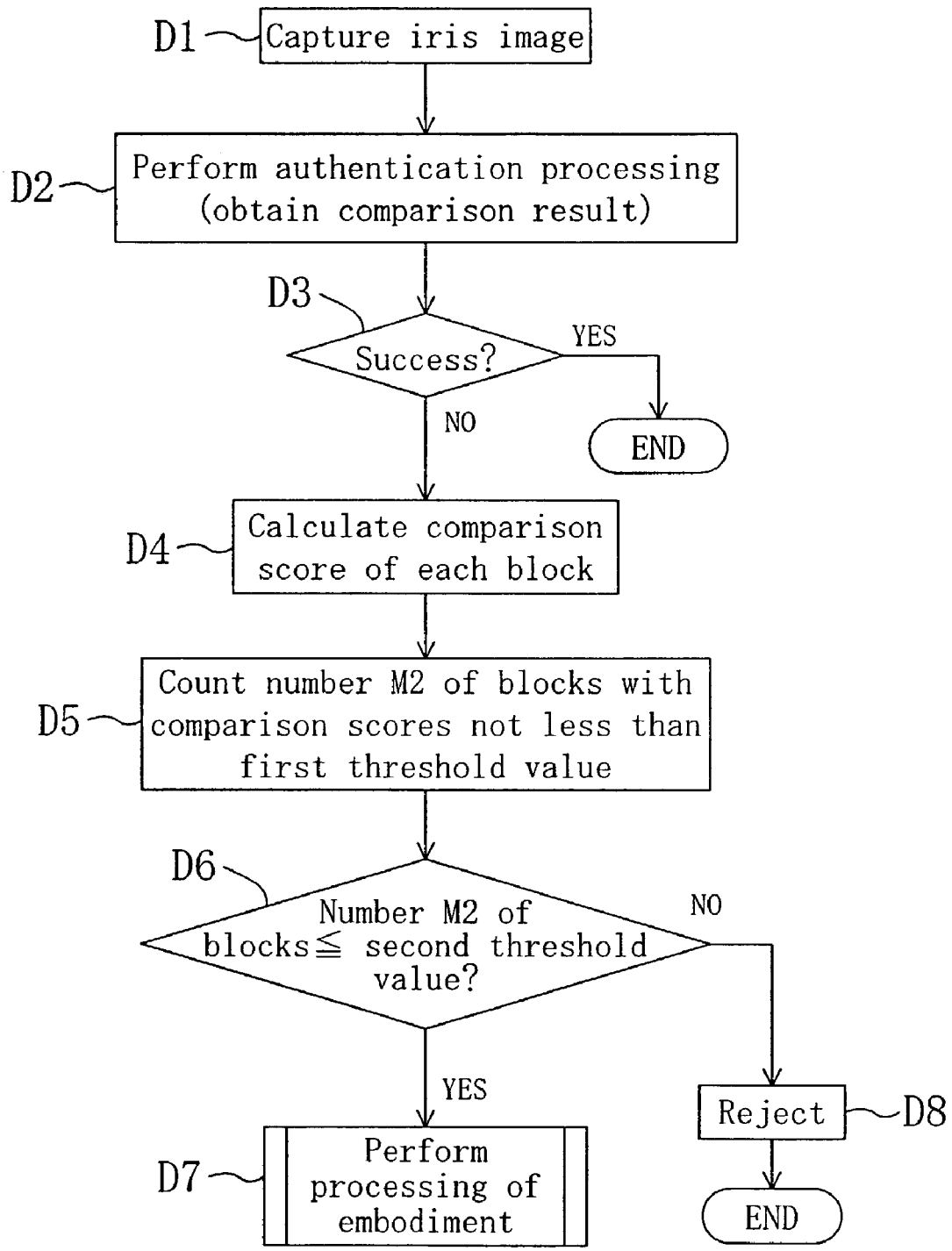
FIG. 25 is a flowchart of a personal authentication method including processing for determining, at an image level, whether or not extraneous light is reflected.

Also, the invention provides the countermeasure against the extraneous light reflection, and hence, if the extraneous light is not reflected, there is no need to capture a plurality of iris images. Furthermore, a system in which a plurality of images are always captured is troublesome for a user. Therefore, the following method may be employed:

As shown in a flowchart of FIG. 25, after capturing one iris image (D1), general authentication (by the method disclosed in the reference document 1) is performed (D2). At this point, the captured iris image is compared with registered iris data of a user previously registered, so as to obtain a comparison result. When the authentication is successful, for example, when a hamming distance obtained in step D2 is not more than a predetermined threshold value, the processing is ended. Otherwise, for example, when the hamming distance exceeds the predetermined threshold value, the flow proceeds to step D4 (D3).

In step D4, the comparison result obtained in step D2 is divided into a plurality of blocks, and a hamming distance is calculated as a comparison score with respect to each of the divided blocks. Then, the number M2 of blocks each having a hamming distance larger than a first threshold value is counted (D5). When the number M2 of blocks is smaller than a second threshold value, it is determined in step D6 that the user is highly probably the registered person and that the extraneous light reflection is caused in the image, and the processing of this embodiment is performed (D7). On the other hand, when the number M2 of blocks exceeds the second threshold value, the user is rejected as another person (D8) and the processing is ended. Specifically, processing for determining whether or not the extraneous light reflection is caused in the captured iris image is performed through steps D2 through D6.

Similarly, conditions for performing the processing of this embodiment may be set as follows:

In the case where a pixel with luminance not less than a predetermined first threshold value is included in an iris image in number larger than a predetermined second threshold value; and with a given first threshold value calculated on the basis of average luminance of an iris image, in the case where a pixel with luminance not less than the threshold value is included in the iris image in number larger than a predetermined second threshold value. Under these conditions, it is judged whether or not the reflection is caused in the iris image at an image level on the basis of the iris image.

Alternatively, the condition for performing the processing of this embodiment may be set as follows:

In the case where the lighting of the image capturing device is turned off, or with a near-infrared light intensity sensor provided on the image capturing device, in the case where the near-infrared light intensity in the outdoor light obtained with the lighting turned off exceeds a predetermined threshold value.

Figure 26:
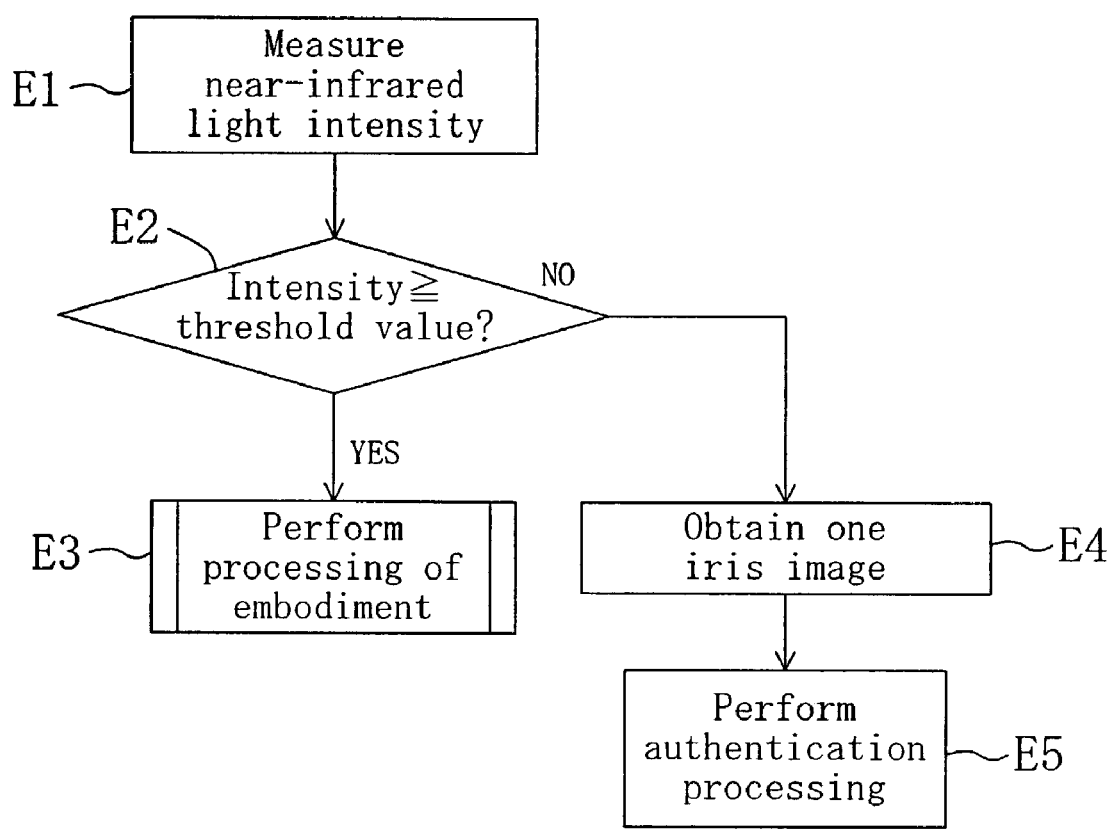
FIG. 26 is a flowchart of a personal authentication method including processing for determining whether or not the authentication is performed in the outdoor light.

Under this condition, it is judged whether or not the iris authentication is performed in the outdoor light on the basis of the switch setting of the lighting or the near-infrared light intensity. For example, as shown in FIG. 26, the intensity of the near-infrared light in the environment for capturing an image is first measured (E1), and when the measured intensity is not less than a predetermined threshold value (YES in E2), the processing of this embodiment is performed (E3). On the other hand, when the measure intensity is lower than the predetermined threshold value (NO in E2), merely one iris image is captured (E4) and the authentication is performed in the conventional manner (E5).

In the case where a plurality of images are captured with the eye ball moved, without instructing the direction for moving the eye ball at random, a direction for eliminating the reflection from an area where it is present in a previously captured image can be calculated for instruction. An area where the extraneous light reflection is present can be presumed as an area corresponding to a block with a large hamming distance, that is, the feature of each divided block. Therefore, when an area where the extraneous light reflection is present can be presumed, it is easy to calculate in which direction the eye ball should be moved. Also, in the case where the iris authentication is performed with the image capturing device held with a hand as described above, an area where the extraneous light reflection is present is presumed in the same manner, so as to obtain the direction for moving the hand. Furthermore, on the basis of the position of an area where the extraneous light reflection is present, a distance for moving the hand is obtained, which may be also instructed.

Embodiment 2

In Embodiment 1, a plurality of iris codes are respectively compared with a registered iris code for generating a plurality of comparison results, and the plural comparison results are integrated to obtain an ultimate comparison score to be used for the authentication. In contrast, in this embodiment, a plurality of iris codes are integrated to generate an integrated iris code, and the integrated iris code is compared with a registered iris code for the authentication.

Figure 19:
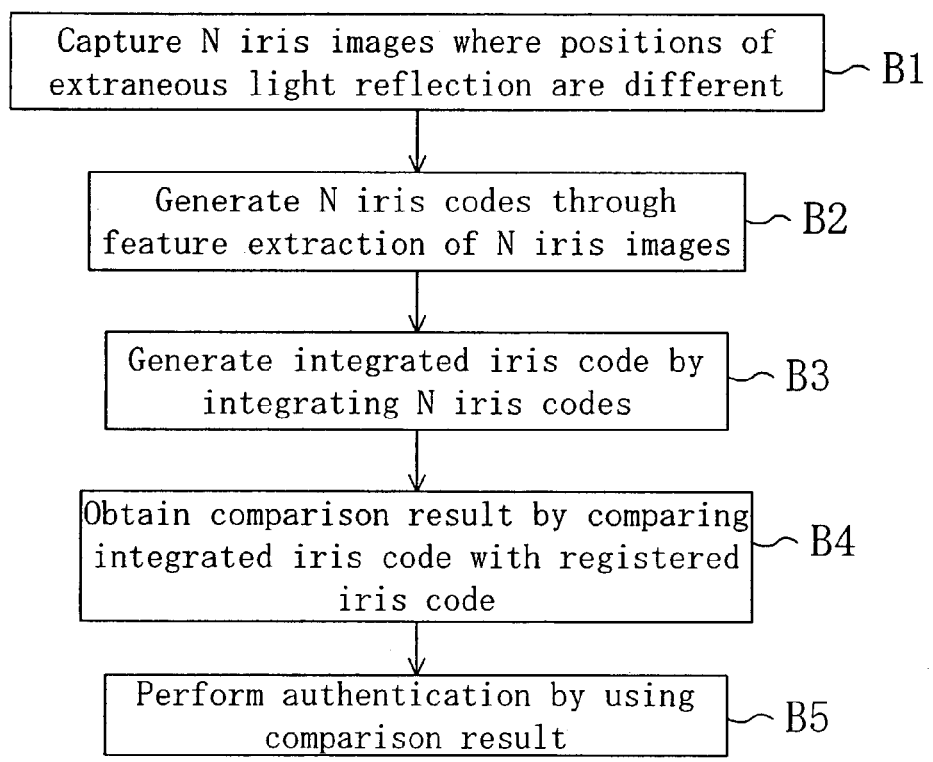
FIG. 19 is a flowchart of a personal authentication method utilizing iris authentication according to Embodiment 2 of the invention.

FIG. 19 is a flowchart of a personal authentication method utilizing iris authentication according to Embodiment 2 of the invention. In FIG. 19, N iris images in which the positions of the extraneous light reflection are respectively different are first captured (B1), and the captured N iris images are subjected to the feature extraction so as to generate N iris codes (B2). The processing B1 and B2 can be performed in the same manner as the processing A1 and A2 of Embodiment 1.

Figure 20:
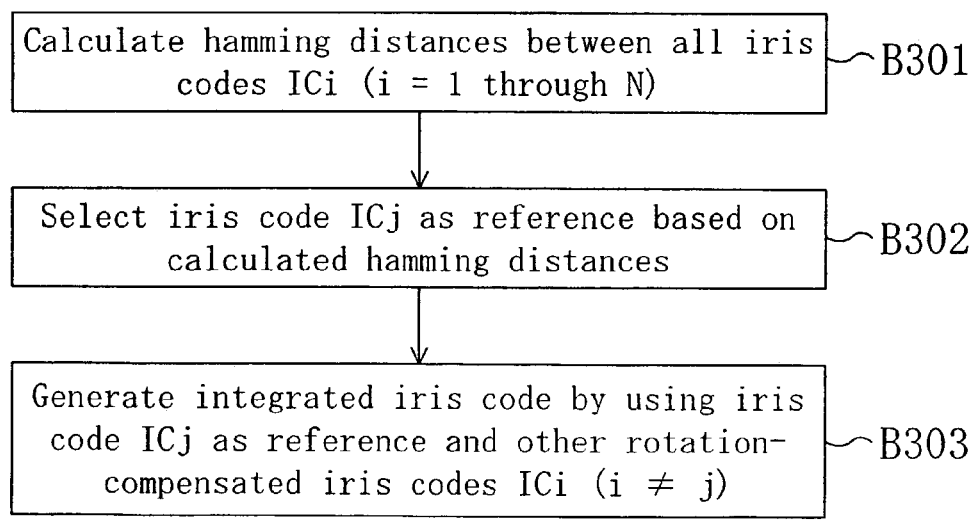
FIG. 20 is a flowchart for showing detailed procedures in processing B3 of FIG. 19.

Next, the N iris codes are integrated so as to generate an integrated iris code (B3). FIG. 20 is a flowchart for showing detailed procedures in the processing B3.

First, with respect to the N iris codes $ICi$ ($i=1$ through N), hamming distances from all the codes are calculated (B301). The number of combinations of the codes is $N(N-1)/2$. At this point, the rotation compensation matching is performed on the iris codes as shown in FIG. 12.

Then, an iris code $ICj$ that attains the minimum sum of the hamming distances from all the other (N−1) codes $ICi$ ($i \neq j$) is selected (B302). Between the selected iris code $ICj$ and the other codes $ICi$ ($i \neq j$), a value of the kth bit (0or1) is decided by majority, so as to determine the value of the kth bit of the integrated iris code (B303). At this point, the kth position of the iris code $ICj$ used as the reference is allowed to correspond to the kth position in the iris code $ICi$ obtained after rotating it by the rotation compensation angle employed for calculating the hamming distance in step B301.

Through this processing B3, the integrated iris code is generated from the N iris codes. In this manner, when the number of bits affected by the extraneous light reflection in an arbitrary bit position of the iris code is smaller than N/2, an integrated iris code free from the influence of the extraneous light reflection can be generated.

Then, the integrated iris code is compared with a registered iris code, so as to obtain a comparison result (B4), which is used for the authentication (B5). The processing B4 and B5 can be performed in the same manner as in the method disclosed in the reference document 1, namely, steps (5) and (6) described in Embodiment 1.

In the above description, the iris code $ICj$ used as the reference is selected under a condition that the sum of the hamming distances from all the other (N−1) codes $ICi$ ($i \neq j$) is the minimum. Instead, for example, the N iris codes are compared with the registered iris code, so that an iris code with the smallest hamming distance can be selected to be used as the reference.

Also, a majority decision is employed for the integration of the plural iris codes in this embodiment, but for example, a weighted average may be used instead.

Furthermore, in the same manner as in Embodiment 1, hamming distances between the N iris codes and the registered iris code may be calculated so that merely iris codes with hamming distances not more than the predetermined threshold value TH3 can be used for generating the integrated iris code.

Modification of Embodiment 2

In the method described in Embodiment 2, the iris codes obtained after the binarization as shown in FIG. 11C are integrated. In contrast, the signals obtained by applying the Gabor filter as shown in FIG. 11B may be integrated so as to binarize the integrated signal. Now, this method will be described as a modification of Embodiment 2.

Figure 21:
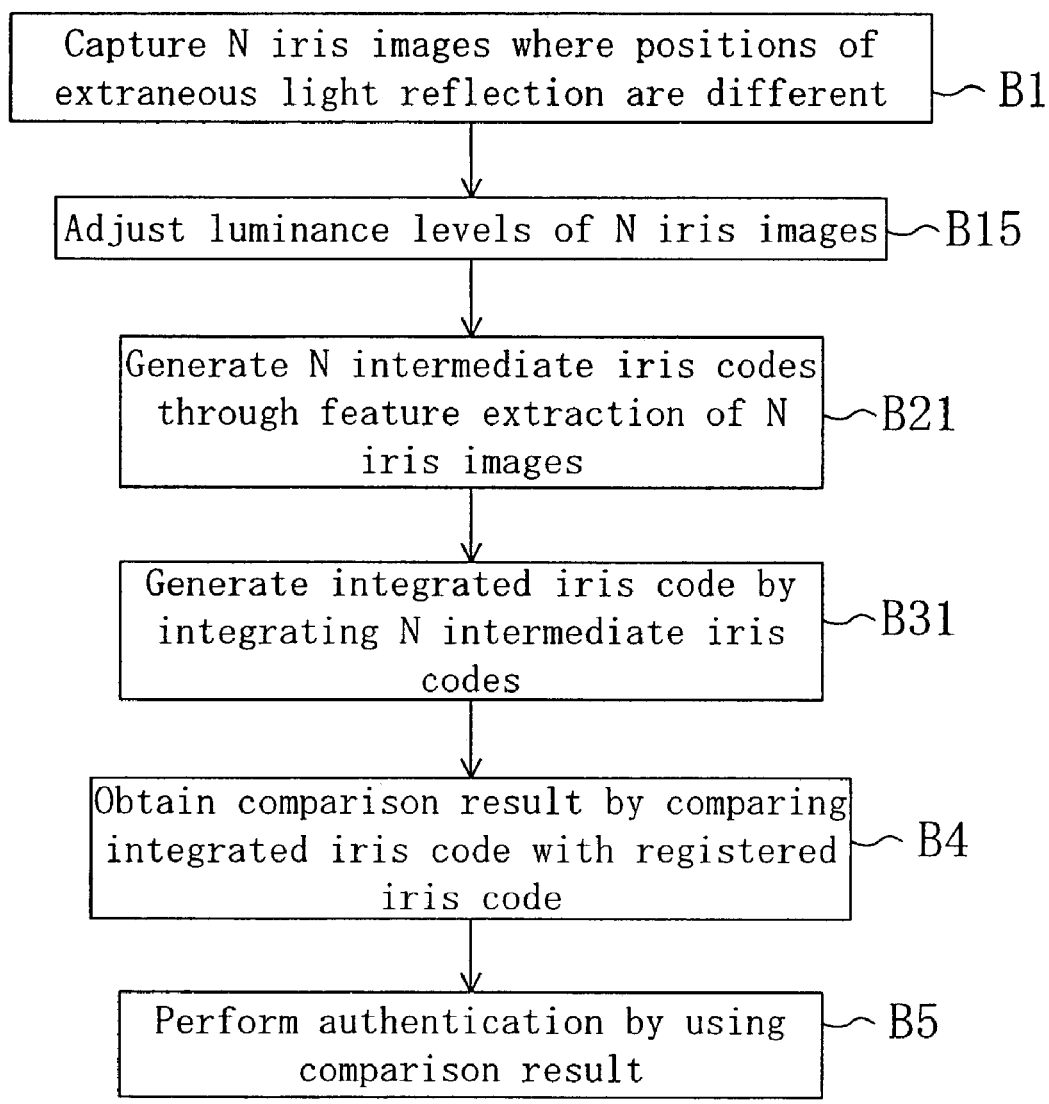
FIG. 21 is a flowchart of a personal authentication method utilizing iris authentication according to a modification of Embodiment 2 of the invention.

FIG. 21 is a flowchart of a personal authentication method utilizing iris authentication according to this modification. In FIG. 21, the same processing as those shown in FIG. 19 are referred to with the same step numbers so as to omit the detailed description.

After capturing N iris images in which the positions of the extraneous light reflection are respectively different (B1), the luminance levels of the N iris images are adjusted (B15). In the case where iris images are captured with a user facing in different directions, there is a possibility that the luminance levels of the N iris images are different due to lens diaphragm control or AGC (auto gain control) of the camera itself. In this case, a lens diaphragm value or a gain value for the AGC is obtained from the camera, so as to adjust the luminance levels.

Then, the N iris images are subjected to the feature extraction, so as to generate N intermediate iris codes serving as iris data corresponding to the features to be used for the authentication (B21). In this modification, the method disclosed in the reference document 1, namely, steps (1) through (3) described in Embodiment 1, is performed, and furthermore, the 2-d Gabor filter is applied as in step (4) for carrying out multi-scale frequency analysis, and thus, a multivalued signal as shown in FIG. 11B is obtained. This multivalued signal is used as the intermediate iris code.

Figure 22:
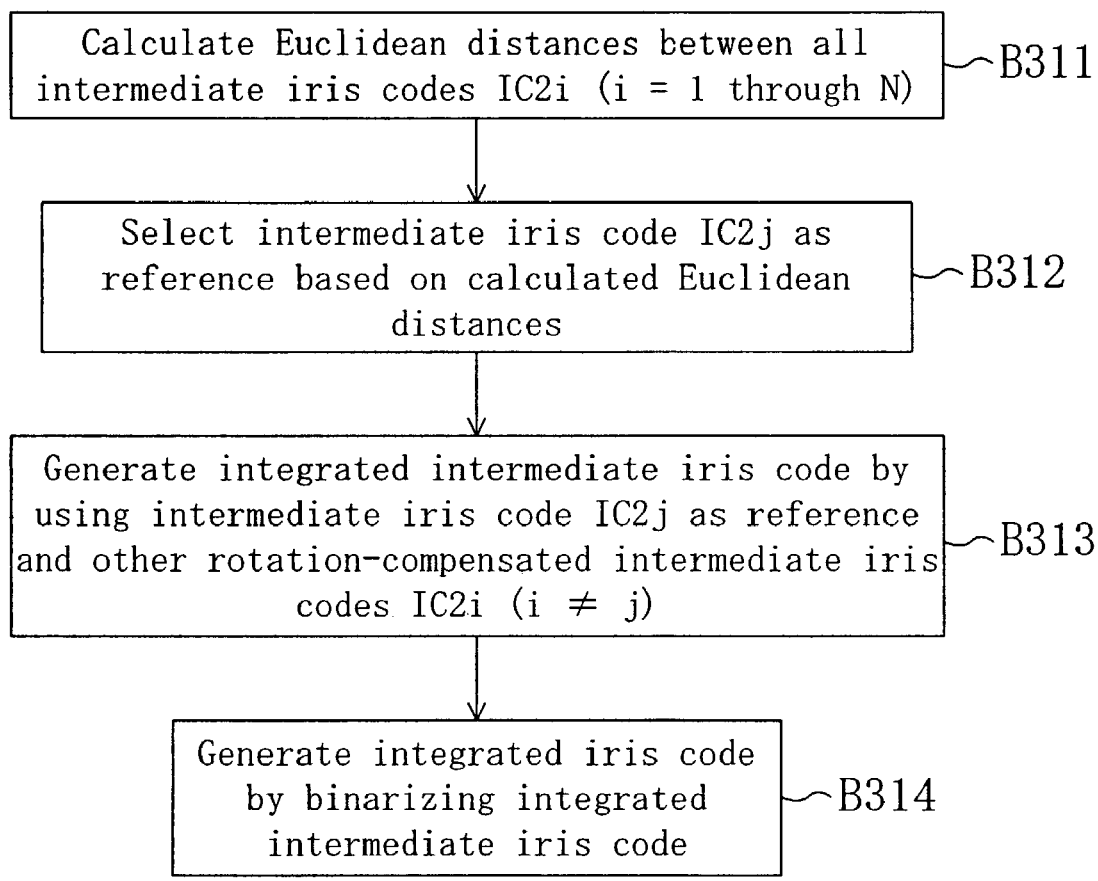
FIG. 22 is a flowchart for showing detailed procedures in processing B31 of FIG. 21.

Then, the N intermediate iris codes are integrated to generate an integrated iris code (B31). FIG. 22 is a flowchart for showing detailed procedures in the processing B31.

First, with respect to the N intermediate iris codes $IC2i$ ($i=1$ through N), Euclidean distances between all the codes are calculated (B311). The number of combinations of the codes is $N(N-1)/2$. At this point, in the same manner as in the comparison of the binary codes in Embodiment 1, the comparison is performed with the angle shifted, so that the Euclidean distance can be calculated in a position for minimizing the Euclidean distance. A Euclidean distance between intermediate iris codes $IC2i$ and $IC2j$ obtained when they are shifted by x in the angular direction is represented by the following equation (1):

$$ED_{ij}(x) = \sum_{k=1}^{K} (IC2_i(k) - IC2_j^x(k))^2 \qquad (1)$$

wherein x is the shift in the angular direction, and $IC2_j^x(k)$ is the kth value obtained by shifting the intermediate iris code $IC2_j$ by x in the angular direction. The Euclidean distance $ED_{ij}$ in a position for minimizing the Euclidean distance is represented by the following equation (2) using the equation (1):

$$ED_{ij} = \min_{x} ED_{ij}(x) \qquad (2)$$

Then, an intermediate iris code IC2j that attains, with the intermediate iris code IC2j used as the reference, the minimum sum of the Euclidean distances from all the other (N−1) intermediate codes IC2i (i≠j) is selected (B312). Thereafter, between the selected intermediate iris code IC2j and the other intermediate codes IC2i (i≠j), a median value of the kth signal values in the intermediate codes is obtained, so as to determine a value of the kth signal of the integrated intermediate iris code (B313). At this point, the kth position of the iris code IC2i used as the reference is allowed to correspond to the kth position in the iris code IC2j obtained after rotating it by the rotation compensation angle employed for calculating the Euclidean distance in step B311.

In this manner, the integrated intermediate iris code is generated from the N intermediate iris codes. In the integrated intermediate iris code, a median value is used for obtaining a Gabor filter output signal in which the influence of the extraneous light reflection is reduced. Instead of the median value, a weighted average may be used. (Although a simple average may be used, the use of a simple average is easily affected by an off value derived from the extraneous light reflection.)

Then, the integrated intermediate iris code is binarized, so as to generate an integrated iris code (B314). The binarization is performed in the same manner as in the generation of an iris code (shown in FIG. 11C) from a general intermediate iris code (shown in FIG. 11B).

Referring to FIG. 21 again, the integrated iris code is compared with a registered iris code, so as to obtain a comparison result (B4), which is used for the authentication (B5)

Embodiment 3

A plurality of comparison results are integrated in Embodiment 1, and a plurality of iris codes or intermediate iris codes are integrated in Embodiment 2. In contrast, in Embodiment 3, a plurality of iris images are integrated so as to generate an integrated iris image, an iris code is extracted from the integrated iris image, and the iris code is compared with a registered iris code for the authentication.

Figure 23:
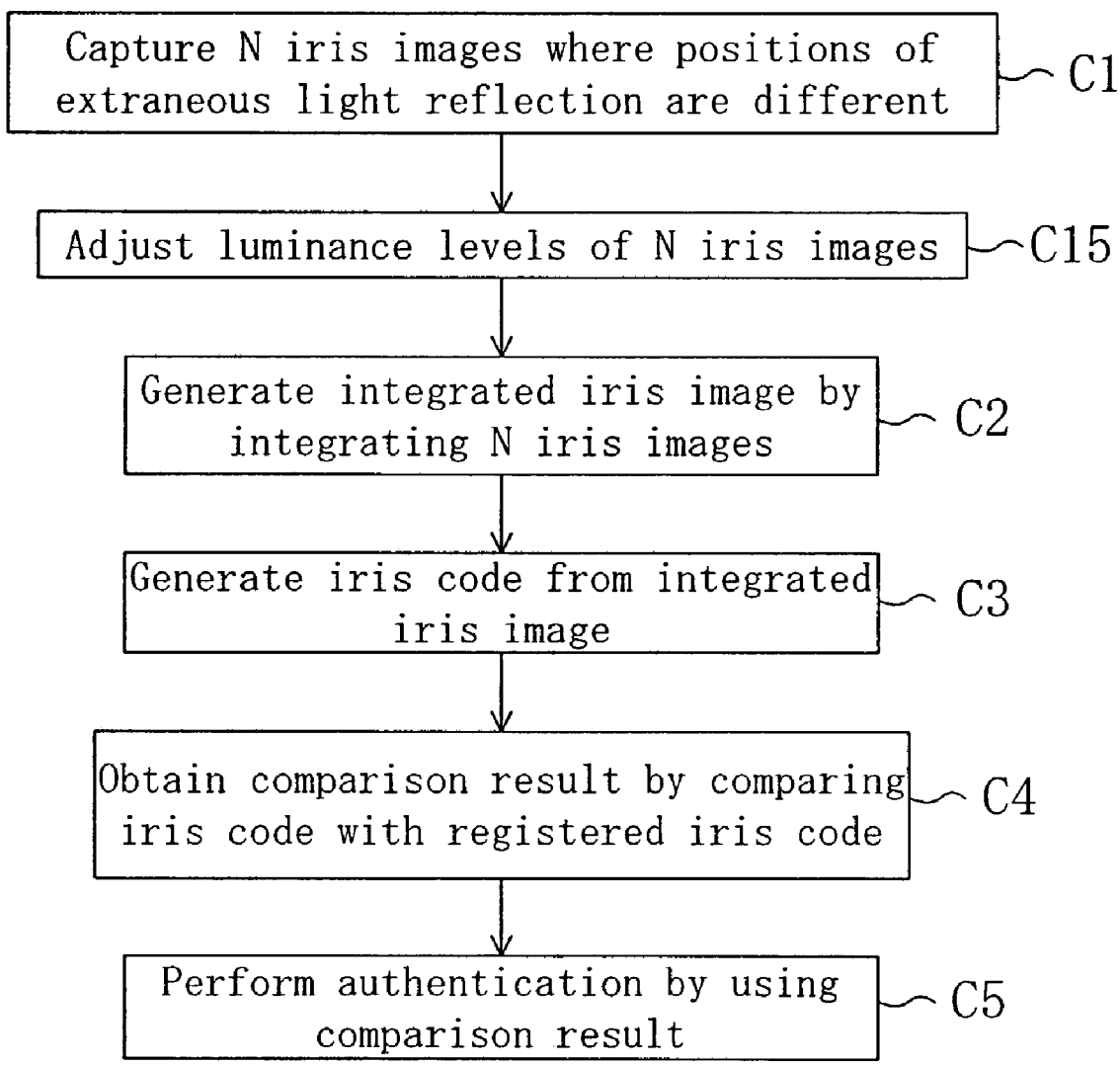
FIG. 23 is a flowchart of a personal authentication method utilizing iris authentication according to Embodiment 3 of the invention.

FIG. 23 is a flowchart of a personal authentication method utilizing iris authentication according to Embodiment 3 of the invention. In FIG. 23, N iris images in which the positions of the extraneous light reflection are respectively different are first captured (C1), and the luminance levels of the N iris images are adjusted (C15). The processing C1 and C15 can be executed in the same manner as the processing B1 and B15 of Embodiment 2.

Figure 24:
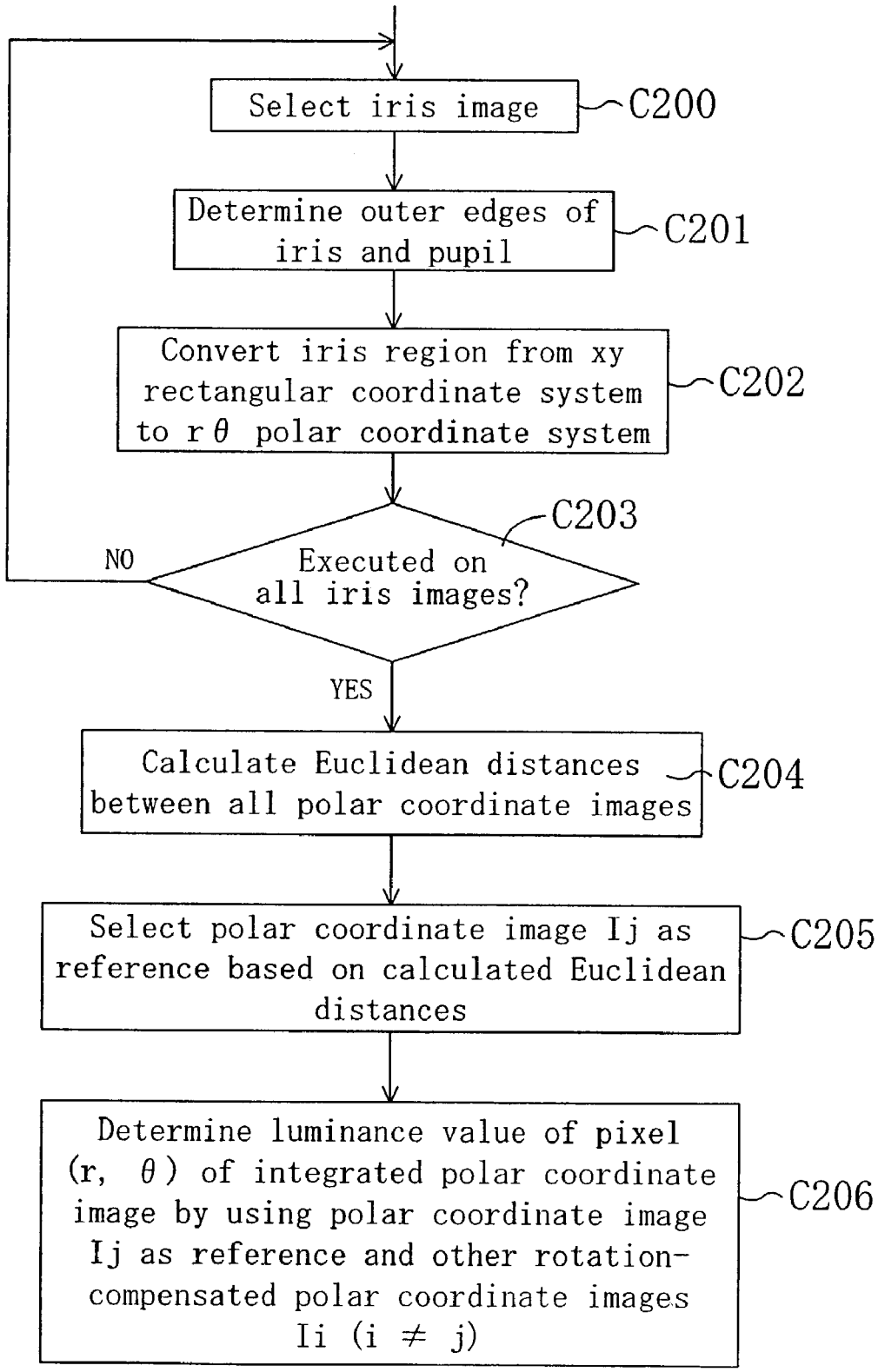
FIG. 24 is a flowchart for showing detailed procedures in processing C2 of FIG. 23.

Then, the N iris images are integrated to generate an integrated iris image (C2). FIG. 24 is a flowchart for showing detailed procedures in the processing C2.

First, one of the N iris images is selected (C200). With respect to the selected iris image, the outer edge of an iris and the outer edge of a pupil are determined (C201), and an iris region is converted from the xy rectangular coordinate system to the rθ polar coordinate system (C202). The processing C201 and C202 are executed by the method disclosed in the reference document 1. The processing C201 and C202 are executed with respect to all the N iris images (C203). The number of pixels in the iris image resulting from the conversion (namely, the polar coordinate image) is set so that r=R and θ=T uniformly in all the N images.

With respect to the N polar coordinate images, Euclidean distances between all the polar coordinate images are calculated (C204). The number of combinations of the images is N(N−1)/2. The Euclidean distance between an image Ii and an image Ij is defined as a sum-square of a difference in the luminance between corresponding pixels by using the following equation (3):

$$ED_{ij}(x) = \sum_{r=1}^{R} \sum_{\theta=1}^{T} (I_i(r, \theta) - I_j(r, \theta + x))^2 \qquad (3)$$

whereas θ+x>T, θ+x is replaced with θ+x−T. The equation (3) represents a Euclidean distance obtained when the image is shifted by x in the angular direction for absorbing the inclination of the face or the rotation of the eye ball itself. The Euclidean distance is calculated by using the equation (3) within a predetermined range of x (allowable rotation range), and the distance x for attaining the minimum Euclidean distance is determined as an ultimate distance EDij as follows:

$$ED_{ij} = \min_{x} ED_{ij}(x) \qquad (4)$$

Then, a polar coordinate image Ij that attains, with the polar coordinate image Ij used as the reference, the minimum sum of the Euclidean distances from all the other (N−1) polar coordinate images (i≠j) is selected (C205). Thereafter, between the selected polar coordinate image Ij and the other polar coordinate images Ii (i≠j), a median value of the luminance of a pixel (r, θ) is obtained, so as to determine the luminance of the pixel (r, θ) of an integrated polar coordinate image (C206). At this point, as the coordinate θ in the angular direction of each polar coordinate image Ii, a coordinate resulting from the rotation correction for minimizing the Euclidean distance from the selected polar coordinate image Ij is used. Also, in the integration of the plural images, a weighted average may be used instead of a median value. (Although a simple average can be used, the use of a simple average can be easily affected by an off value derived from the extraneous light reflection.)

Referring to FIG. 23 again, an iris code is generated from the integrated iris image (C3), and the iris code is compared with a registered iris code so as to obtain a comparison result (C4). Thereafter, the comparison result is used for the authentication (C5). The processing C4 and C5 can be performed by the method disclosed in the reference document 1.

In this embodiment, polar coordinate images are subjected to the rotation correction after adjusting the luminance level, and median values of the respective pixels are obtained to generate the synthesized polar coordinate image. Since a medium value is used, the influence of the reflection is reduced in the resultant polar coordinate image. In contrast, when an average is used, an off value derived from the reflection largely affects. Accordingly, the subsequent processing can be performed with the influence of the reflection reduced in this embodiment.

Needless to say, the processing of Embodiment 2 and 3 can also employ the procedure of step D7 of the flow of FIG. 25 or the procedure of step E3 of the flow of FIG. 26.

As described so far, according to this invention, a plurality of iris images in which the positions of the extraneous light reflection are respectively different are used, so that the authentication can be performed with the influence of the extraneous light reflection reduced. Accordingly, personal authentication with sufficiently high accuracy can be executed even in the outdoor light. Also, a plurality of iris images can be easily captured.

What is claimed is:

1. A personal authentication method comprising the steps of:
    capturing, by using an image capturing device, a plurality of iris images of a person to be authenticated in which positions of extraneous light reflection are respectively different; and
    performing authentication by using said plurality of iris images and registered iris data.

2. The personal authentication method of claim 1, wherein said image capturing device instructs said person on a facing direction in said capturing step.

3. The personal authentication method of claim 1, wherein said image capturing device guides a sight line of said person in said capturing step.

4. The personal authentication method of claim 1, wherein a position of a camera in said image capturing device is changed in said capturing step.

5. The personal authentication method of claim 1, wherein said image capturing device includes a plurality of cameras, and
    said image capturing device captures said plurality of iris images by using said plurality of cameras in said capturing step.

6. The personal authentication method of claim 1, wherein said image capturing device instructs said person on a direction for moving his or her hand holding said image capturing device in said capturing step.

7. The personal authentication method of claim 1, wherein said authentication step includes the steps of:
    extracting iris data corresponding to features for authentication respectively from said plurality of iris images;
    obtaining a plurality of comparison results by respectively comparing said extracted iris data with said registered iris data; and
    obtaining an ultimate comparison score by integrating said plurality of comparison results, and
    wherein the authentication is performed on the basis of said ultimate comparison score.

8. The personal authentication method of claim 1, wherein said authentication step includes the steps of:
    extracting iris data corresponding to features for authentication respectively from said plurality of iris images;
    generating integrated iris data by integrating said extracted iris data; and
    obtaining a comparison result by comparing said integrated iris data with said registered iris data, and
    wherein the authentication is performed on the basis of said comparison result.

9. The personal authentication method of claim 1, wherein said authentication step includes the steps of:
    generating an integrated iris image by integrating said plurality of iris images;
    extracting iris data corresponding to a feature for authentication from said integrated iris image; and
    obtaining a comparison result by comparing said iris data with said registered iris data, and
    wherein the authentication is performed on the basis of said comparison result.

10. A personal authentication method comprising the steps of:
    extracting iris data corresponding to features for authentication respectively from a plurality of iris images of a person to be authenticated;
    obtaining a plurality of comparison results by respectively comparing said extracted iris data with registered iris data; and
    selecting, from said plurality of comparison results, a comparison result with a comparison score not less than a given value or a comparison result with a comparison score not more than a given value,
    wherein the authentication is performed on the basis of said selected comparison result.

11. A personal authentication method comprising the steps of
    extracting iris data corresponding to features for authentication respectively from a plurality of iris images of a person to be authenticated;
    obtaining a plurality of comparison results by respectively comparing said extracted iris data with registered iris data; and
    obtaining a synthesized comparison result by dividing each of said plurality of comparison results into a plurality of blocks and synthesizing said plurality of comparison results in each of said plurality of blocks,
    wherein the authentication is performed on the basis of said synthesized comparison result.

12. A personal authentication method comprising the steps of:
    capturing an iris image of a person to be authenticated;
    determining, on the basis of said iris image, whether or not extraneous light reflection is caused in said iris image; and
    capturing a plurality of iris images of said person in which positions of the extraneous light reflection are respectively different and performing authentication by using said plurality of iris images, when it is determined that the extraneous light reflection is caused.

13. The personal authentication method of claim 12, wherein said determining step includes the steps of:
    obtaining a comparison result by comparing said iris image with registered iris data;
    dividing said comparing result into a plurality of blocks and calculating a comparison score of each of said plurality of blocks; and determining that the extraneous light reflection is caused when the number of blocks each having the comparison score not less than a first threshold value is not more than a second threshold value.

14. A personal authentication method comprising the steps of:
measuring an intensity of near-infrared light in an environment where an iris image is captured; and
capturing a plurality of iris images of a person to be authenticated in which positions of extraneous light reflection are respectively different and performing authentication by using said plurality of iris images, when said intensity is not less than a threshold value.

15. A personal authentication apparatus comprising:
an image capturing unit for capturing a plurality of iris images of a person to be authenticated in which positions of extraneous light reflection are respectively different; and
an authentication processing unit for performing authentication by using said plurality of iris images captured by said image capturing unit and registered iris data.

16. The personal authentication apparatus of claim 15, wherein said image capturing unit includes:
a camera; and
means for instructing said person on a facing direction.

17. The personal authentication apparatus of claim 15, wherein said image capturing unit includes:
a camera; and
means for guiding a sight line of said person.

18. The personal authentication apparatus of claim 15, wherein said image capturing unit includes:
a camera; and
means for changing a position of said camera with respect to said personal authentication apparatus.

19. The personal authentication apparatus of claim 15, wherein said image capturing unit includes a plurality of cameras to be used for capturing said plurality of iris images.

20. The personal authentication apparatus of claim 15, wherein said image capturing unit includes:
a camera; and
means for instructing a person to be authenticated on a direction for moving his or her hand holding said device.

21. The personal authentication method of claim 1, wherein the extraneous light is sunlight.

22. The personal authentication method of claim 12, wherein the extraneous light is sunlight.

23. The personal authentication method of claim 14, wherein the extraneous light is sunlight.

24. The personal authentication apparatus of claim 15, wherein the extraneous light is sunlight.

* * * * *

UNITED STATES PATENT AND TRADEMARK OFFICE
CERTIFICATE OF CORRECTION

| | | |
|---|---|---|
| PATENT NO. | : 7,155,035 B2 | Page 1 of 1 |
| APPLICATION NO. | : 10/358967 | |
| DATED | : December 26, 2006 | |
| INVENTOR(S) | : Kenji Kondo et al. | |

It is certified that error appears in the above-identified patent and that said Letters Patent is hereby corrected as shown below:

Title Page

(30) Foreign Application Priority Data: "May 2, 2002" should be -- February 5, 2002 --

(56) References Cited, Foreign Patent Documents: Delete "JP10-162416"

Signed and Sealed this

Tenth Day of July, 2007

JON W. DUDAS
*Director of the United States Patent and Trademark Office*